(12) United States Patent
Hedtke et al.

(10) Patent No.: US 7,918,134 B2
(45) Date of Patent: Apr. 5, 2011

(54) THERMAL-BASED DIAGNOSTIC SYSTEM FOR PROCESS TRANSMITTER

(75) Inventors: Robert C. Hedtke, Young America, MN (US); Charles R. Willcox, Eden Prairie, MN (US); David A. Broden, Andover, MN (US); Andrew Juri Klosinski, Waconia, MN (US); John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 120 days.

(21) Appl. No.: 12/287,106

(22) Filed: Oct. 6, 2008

(65) Prior Publication Data
US 2010/0083768 A1   Apr. 8, 2010

(51) Int. Cl.
*G01L 9/12* (2006.01)
(52) U.S. Cl. .......................................... 73/718; 73/724
(58) Field of Classification Search .................. None
See application file for complete search history.

(56) References Cited

U.S. PATENT DOCUMENTS

| | | | |
|---|---|---|---|
| 4,777,826 A | 10/1988 | Rud, Jr. et al. | |
| 5,665,899 A | 9/1997 | Willcox | |
| 5,709,337 A | 1/1998 | Moser et al. | |
| 6,295,875 B1 | 10/2001 | Frick et al. | |
| 6,444,487 B1 | 9/2002 | Boggs et al. | |
| 6,484,585 B1 | 11/2002 | Sittler et al. | |
| 6,568,278 B2 | 5/2003 | Nelson et al. | |
| 6,568,279 B2 | 5/2003 | Behm et al. | |
| 7,258,021 B2 * | 8/2007 | Broden | 73/756 |
| 2005/0072239 A1 | 4/2005 | Longsdorf et al. | |
| 2005/0258959 A1 * | 11/2005 | Schnaare et al. | 340/539.26 |
| 2005/0274417 A1 | 12/2005 | Perry et al. | |
| 2006/0010983 A1 | 1/2006 | Sund et al. | |
| 2006/0162458 A1 * | 7/2006 | Broden | 73/708 |
| 2007/0068922 A1 | 3/2007 | Westfield et al. | |
| 2007/0138909 A1 | 6/2007 | Mortet et al. | |
| 2007/0241916 A1 | 10/2007 | Hedtke | |

(Continued)

FOREIGN PATENT DOCUMENTS

JP            08-35901          2/1996

(Continued)

OTHER PUBLICATIONS

"Tracepak Bundles for Instrument Impulse Lines" from: http://www.obcorp.com/webpages/TubingBundles/TXinstru.htm, visited Apr. 30, 2008, 3 pages.

(Continued)

*Primary Examiner* — Andre J Allen
(74) *Attorney, Agent, or Firm* — Kinney & Lange, P.A.

(57) ABSTRACT

A process transmitter for measuring a process variable in an industrial process comprises a sensor module, a heating device and transmitter circuitry. The sensor module has a sensor for sensing a process variable of an industrial process and generating a sensor signal. The heating device is connected to the sensor module for generating a heat pulse to influence generation of the sensor signal. The transmitter circuitry is connected to the sensor and the heating device. The transmitter circuitry verifies operation of the sensor by measuring a change in the sensor signal due to the heat pulse. In one embodiment of the invention, the heat pulse thermally expands a volume of a fill fluid within the process transmitter. In another embodiment, the heat pulse changes a physical property, such as dielectric, of a fill fluid within the process transmitter.

63 Claims, 13 Drawing Sheets

U.S. PATENT DOCUMENTS

2007/0270982 A1 11/2007 Foss et al.
2008/0223140 A1* 9/2008 Broden .......................... 73/718

FOREIGN PATENT DOCUMENTS

| JP | 08-128911 | 5/1996 |
| JP | 08-166309 | 6/1996 |
| JP | 2004-144491 | 5/2004 |
| JP | 2007-047012 | 2/2007 |
| WO | WO 2010042148 A3 | 4/2010 |

OTHER PUBLICATIONS

"Advantage of Electric Tracers" from: www.obcorp.com/WebPages/TubingBundles/TXadelec.htm, visited Apr. 30, 2008, 3 pages.

"Tracepak and Heated Hose Introduction" from: http:www.obcorp.com/WebPages/TubingBundles/TXHH.htm, visited Apr. 30, 2008, 3 pages.

"O'Brien J-Line Jacketed Tubing" brochure, Feb. 4, 2003, 2 pages.

"O'Brien S-Line Preinsulated Tubing" brochure, Feb. 10, 2007, 1 page.

"O'Brien TRACEPAK" brochure, Nov. 1, 2006, 16 pages.

Sittler, Fred et al., "Process variable transmitter with acceleration sensor," Aug. 6, 2007, U.S. Appl. No. 11/834,221.

Official Search Report and Written Opinion in counterpart foreign Application No. PCT/US2009/005360, filed Sep. 29, 2009.

International Search Report and Written Opinion for PCTUS2009/006007, Jun. 11, 2009.

* cited by examiner

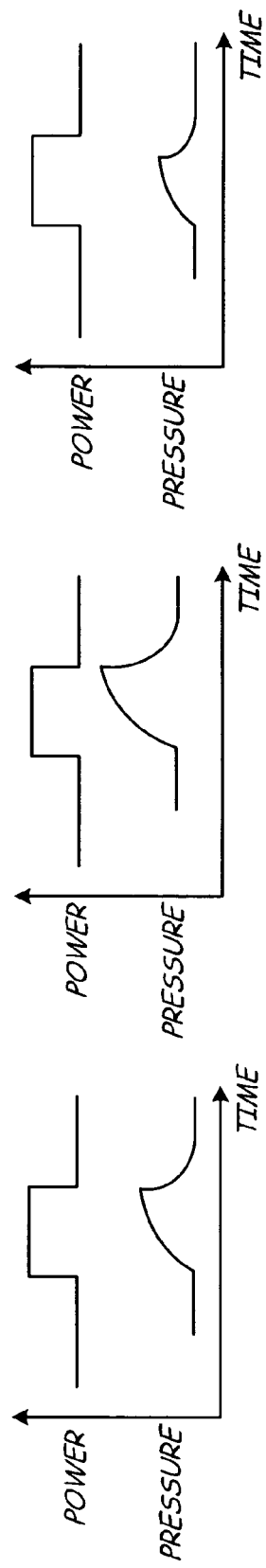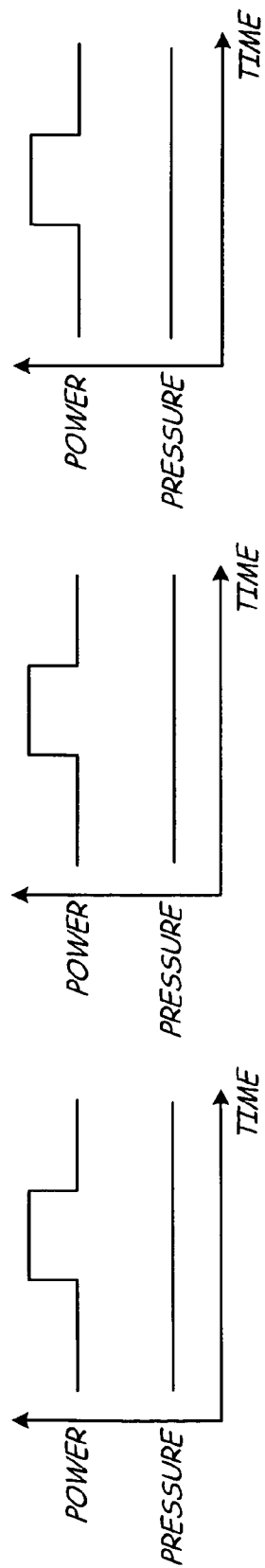

THERMAL-BASED DIAGNOSTIC SYSTEM FOR PROCESS TRANSMITTER

BACKGROUND

The present invention relates generally to industrial process transmitters for use in industrial process control systems. More particularly, the present invention relates to diagnostic systems for verifying performance of process transmitters.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include pressure transducers that produce an electrical output as a function of the pressure of a process fluid, such as in water lines, chemical tanks or the like. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process parameter can be regulated from the control room by including automated switches, valves, pumps and other similar components in the process control system and the control loop.

It is frequently desirable to perform checks or diagnostics of the process control loop to verify operation and performance of each transmitter within the control loop. More particularly, it is desirable to verify performance of each transmitter remotely from the control room without performing invasive procedures on the control loop or physically removing the transmitter from the control loop and industrial process control system. Currently, diagnostic capabilities are limited to obtaining information relating only to performance of the control loop and transmitter electronics. For example, the control room is able to initiate a test signal that originates from the transmitter electronics and then propagates throughout the control loop. The control room, knowing the magnitude and quality of the initiated test signal, can then verify that the control loop and transmitter respond properly to the test signal. The control room thus mimics sensor output and checks that the electronics and control loop respond in kind. The control loop, however, is not able to verify functionality of the sensor. For example, the mimicked test signal does not verify if the sensor is undamaged and producing a valid pressure signal.

Sensors respond to a physical change in the process fluid, rather than an electrical input. For example, capacitance-based pressure sensors used in pressure transmitters include a fixed electrode plate and an adjustable electrode plate, which typically comprises a flexible sensor diaphragm. The sensor diaphragm is connected to the process fluid through a simple hydraulic system that communicates the process fluid pressure to the sensor. The hydraulic system comprises a sealed passageway in which the sensor diaphragm is positioned at a first end, and a flexible isolation diaphragm is positioned at a second end to engage the process fluid. The sealed passageway is filled with a precise amount of hydraulic fluid that adjusts the position of the sensor diaphragm as the process fluid influences the isolation diaphragm. As the pressure of the process fluid changes, the position of the sensor diaphragm changes, resulting in a change in capacitance of the pressure sensor. The electrical output of the pressure sensor is related to the capacitance and thus changes proportionally as the process fluid pressure changes. Thus, proper verification of the sensor requires physically moving the sensor diaphragm.

Previous attempts at sensor diagnostics have involved using deadweight testers or hand pumps to deliberately increase the pressure of the process fluid or the fill fluid to check if the sensor responds. These methods require an operator to visit the location of the transmitter and the process transmitter to be taken offline, thus inhibiting automation of the verification process. Other methods involve providing piezoelectric crystals within the fill fluid that create a transient pressure pulse that influences the sensing diaphragm. Other attempts have involved using accelerometers to detect induced vibrations of the fill fluid to compare with corresponding changes in sensor output. It is, however, difficult to control the pulses generated by the crystals or the induced vibrations. Thus, repeatability of the diagnostic is limited and verification of the pressure sensor is inconsistent. It is also difficult to provide activation energy to piezoelectric crystals within the fill fluid or supply adequate power to the accelerometers. Furthermore, such systems add considerable expense to the product and manufacturing thereof. There is, therefore, a need for a simple and cost effective remote diagnostic system and method that accurately verifies operation of sensors in industrial process transmitters.

SUMMARY

The present invention is directed to a process transmitter for measuring a process variable in an industrial process. The process transmitter comprises a sensor module, a heating device and transmitter circuitry. The sensor module has a sensor for measuring a process variable of an industrial process and generating a sensor signal. The heating device is connected to the sensor module for generating a heat pulse to influence generation of the sensor signal. The transmitter circuitry is connected to the sensor and the heating device. The transmitter circuitry verifies operation of the sensor by measuring a change in the sensor signal due to the heat pulse. In one embodiment of the invention, the heat pulse thermally expands a volume of a fill fluid within the process transmitter. In another embodiment, the heat pulse changes a physical property, such as dielectric, of a fill fluid within the process transmitter.

BRIEF DESCRIPTION OF THE DRAWINGS

FIGS. 9A through 9F show various graphs of pressure signal output in response to a power input to a heating device that correspond to various diagnoses of a pressure sensor.

DETAILED DESCRIPTION

Figure 1:
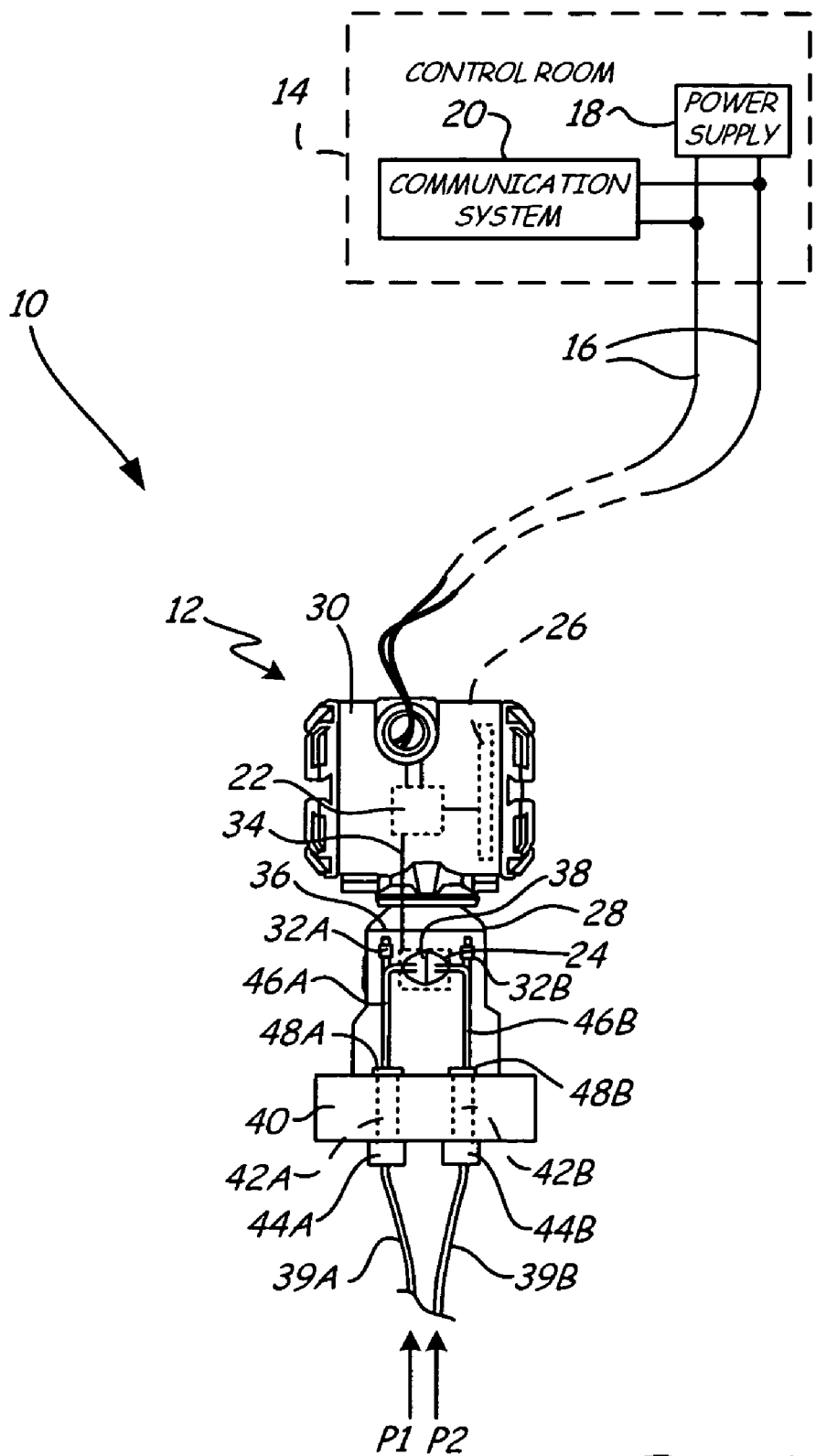
FIG. 1 shows a process control system including a planar-mounted pressure transmitter having a thermal-based sensor diagnostic system of the present invention.

FIG. 1 shows process control system 10, which includes planar-mounted pressure transmitter 12 and control room 14. Pressure transmitter 12 comprises a COPLANAR™ differential pressure sensor that senses the pressure difference between pressure P1 and pressure P2 in a process fluid and then relays an electronic signal to control room 14 over control loop 16. Control room 14 also supplies power to transmitter 12 from power supply 18 over control loop 16. Control loop 16 also enables communication system 20 to transmit data from control room 14 to transmitter 12, and to receive data from transmitter 12. In various embodiments, control loop 16 and communication system 20 operate over a digital network protocol such as FOUNDATION™ Fieldbus, or an analog network protocol such as a 4-20 mA HART® system. In other embodiments, transmitter 12 and control room 14 communicate over a wireless network. In still other embodiments, output of transmitter 12 is readable by a handheld device linked by wires or wirelessly with pressure transmitter 12.

Pressure transmitter 12 includes transmitter circuitry 22, sensor 24, LCD screen 26, sensor module 28, electronics housing 30 and heating devices 32A and 32B. Transmitter circuitry 22 is electronically connected through wiring 34 to circuit board 36 for communication with control loop 16. Transmitter circuitry 22 includes components for transmitting electrical pressure signals generated by pressure sensor 24 over control loop 16 to control room 14 or a local display such as LCD screen 26, or both. Circuitry 22 conditions the output of sensor 24 into a format compatible with control loop 16. Based on the data received from sensor 24 and transmitter 12, control room 14 is able to adjust process parameters either through control loop 16 or another control loop. For example, control room 14 can adjust the flow of a process fluid by adjusting appropriate actively controlled valves. Furthermore, through control loop 16 control room 14 is able to perform diagnostic evaluation of transmitter 12 using communication system 20 and transmitter circuitry 22. Specifically, using heating devices 32A and 32B, control room 14 is able to verify mechanical and electrical functionality of sensor 24.

Sensor 24 comprises a pressure sensor having a flexible sensor element 38 that moves in response to pressures P1 and P2, such as from a process fluid presented through connections 39A and 39B. In one embodiment, connections 39A and 39B comprise impulse piping, and in another embodiment comprise remote seal assembly capillaries. Process flange 40 includes channels 42A and 42B, and connectors 44A and 44B. Sensor module 28 includes hydraulic isolation tubes 46A and 46B, and isolation diaphragms 48A and 48B. Isolation tubes 46A and 46B comprise passageways that are coupled with sensor 24 at their first ends and isolation diaphragms 48A and 48B at their second ends. Isolation diaphragms 48A and 48B are connected with process flange 40, which is typically bolted or otherwise secured to the base of module 28 of transmitter 12. In one embodiment flange 40 comprises a COPLANAR™ process flange. Hydraulic isolation tubes 46A and 46B are supplied with a sensor fill fluid. The fill fluid is substantially incompressible to transmit pressures P1 and P2 to sensor 24 and typically comprise a silicone-oil hydraulic fluid, such as DC 200®, DC 704® or Syltherm XLT® silicone-oil as is commercially available from Dow Corning Corporation, Midland, Mich., USA. However, other fluids are also used. The fill fluid displaces the positions of isolation diaphragms 48A and 48B, which displaces the volumes of the fill fluid within isolation tubes 46A and 46B. The fill fluid displaces the position of flexible sensor element 38, which changes the electronic pressure signal generated by sensor 24, thus indicating a change in pressures P1 and P2. Thus, a process fluid is hydraulically linked with sensor 24 through two connections commonly referred to the high and low pressure sides.

Heating devices 32A and 32B are controlled by transmitter circuitry 22 to cause a controlled, transient heating of the fill fluid within isolation tubes 46A and 46B to produce controlled, transient thermal expansion of the fill fluid. The thermal expansion of the fill fluid causes a transient change to the pressure of the fill fluid and a deflection of flexible sensor element 38 within sensor 24. Transmitter circuitry 22 and control room 14 are able to verify that sensor 24 produces a change in the sensor signal, and that the change corresponds to the input to heating devices 32A or 32B.

Figure 2:
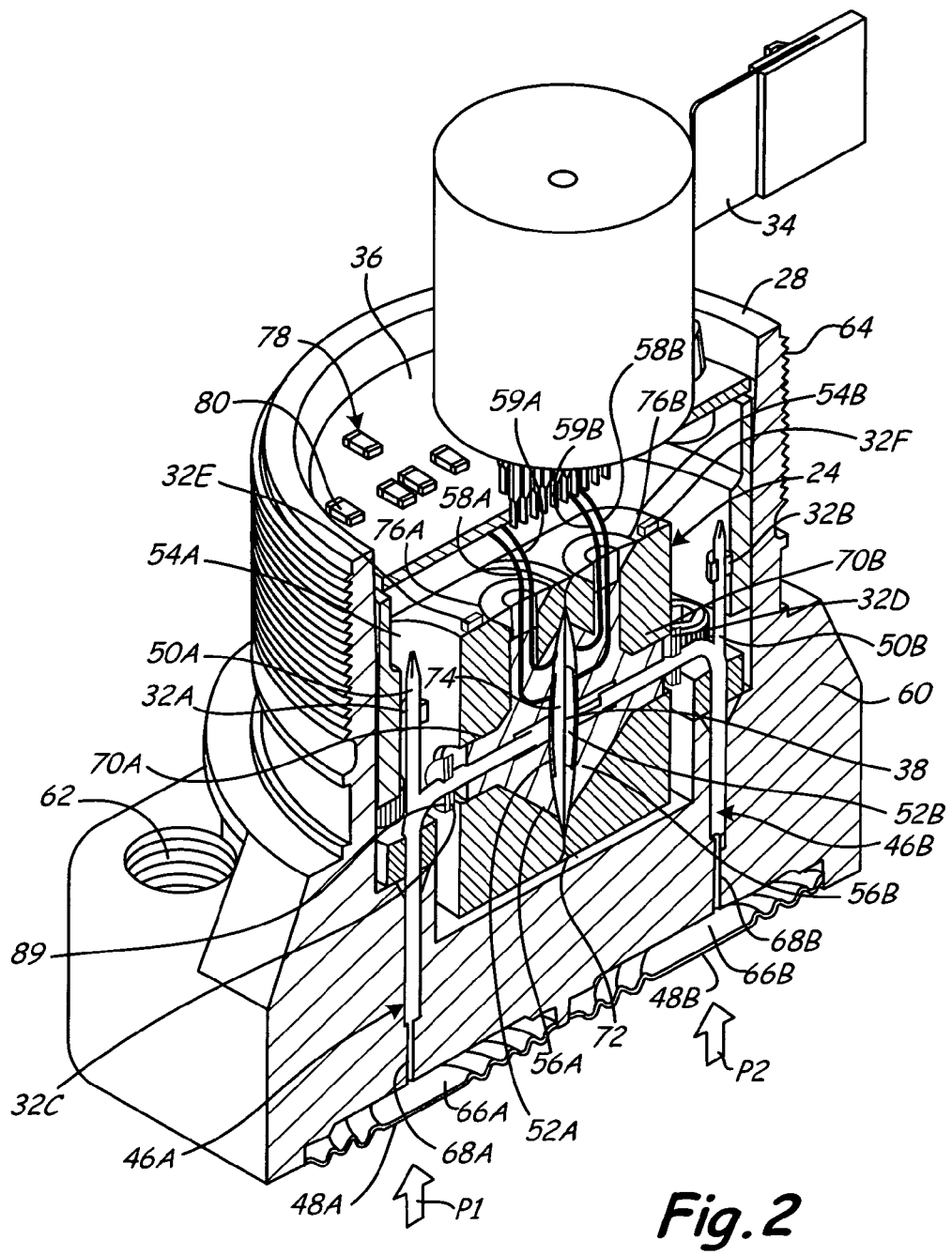
FIG. 2 shows a perspective view of a sensor module having a capacitance-based differential pressure sensor and heating devices used in the pressure transmitter of FIG. 1.

FIG. 2 shows one embodiment of the present invention in which sensor module 28 includes heating devices 32A through 32F positioned at various positions near sensor 24 within module 28. Although all are illustrated here for convenience, not all of heating devices 32A through 32F need be used to implement the thermal-based diagnostic system of the present invention. Typically, only one heating device needs to be implemented on the high and low pressure sides of sensor 24. In other embodiments, the invention may be carried out with only a single heating device. Sensor 24 is a transducer that produces an electrical signal in response to a change in pressures P1 and P2. In the embodiment shown, sensor 24 comprises a differential, capacitance-based pressure cell in which sensor element 38 comprises a flexible capacitor plate. In other embodiments, sensor 24 may comprise other transducers that detect a physical change in the pressure of a fluid, such as a piezoelectric crystal or a strain gage, as is described with reference to FIGS. 13 and 14.

Pressure sensor 24 includes sensor diaphragm 38, isolation tube 46A, isolation tube 46B, fill tube 50A, fill tube 50B, first electrode plate 52A, second electrode plate 52B, first cell half 54A, second cell half 54B, first insulator 56A, second insulator 56B, first lead wires 58A and 59A and second lead wires 58B and 59B. In one embodiment, pressure sensor 24 comprises a five-wire sensor, as is described in U.S. Pat. No. 6,295,875 to Frick et al., and assigned to Rosemount, Inc., Eden Prairie, Minn., which is incorporated by this reference. In other embodiments, pressure sensor 24 may comprise a three-wire sensor, as is known in the art.

Pressure sensor 24 is assembled on base 60 within module 28 of transmitter 12. Module 28 and base 60 are typically cast and machined as a unitary piece, with module 28 primarily comprising a hollowed out cavity for holding sensor 24. Module 28 and base 60 together provide a framework that permits diaphragms 48A and 48B to hydraulically interact with sensor 24 through isolation tubes 46A and 46B. Base 60 includes bores 62 such that transmitter 12 can be connected to flange 40 or some other process connection such as impulse piping. Module 28 includes threads 64 for connecting with housing 30 of transmitter 12. Base 60 also includes counterbores that, along with isolation diaphragms 48A and 48B, form isolation chambers 66A and 66B, respectively. Isolation chambers 66A and 66B are connected with isolation tubes 46A and 46B, respectively, by bores 68A and 68B provided in base 60.

Isolation tubes 46A and 46B typically comprise segments of stainless steel tubing welded to base 60 and cell halves 54A and 54B. Isolation tubes 46A and 46B are connected with insulators 56A and 56B, respectively, which are disposed in bores 70A and 70B, respectively, within sensor cell halves 54A and 54B. Insulators 56A and 56B comprise cup-shaped platforms upon which electrodes 52A and 52B are deposited, respectively. The cup shaped platforms mate along joint 72 when cell halves 54A and 54B are assembled to form interior cavity 74 within sensor 24. Insulators 56A and 56B are comprised of any suitable insulating material such as glass or ceramic. Insulators 56A and 56B include bores that extend through to interior cavity 74 such that isolation tubes 46A and 46B connect isolation chambers 66A and 66B with interior cavity 74. Sensor diaphragm 38 is disposed between cell halves 54A and 54B within interior cavity 74 such that diaphragm 38 opposes electrodes 52A and 52B. Electrodes 52A and 52B are connected to lead wires 58A and 58B, respectively, which extend through insulators 56A and 56B and exit cell halves 54A and 54B at openings 76A and 76B, respectively. Lead wires 58A and 58B are connected to circuit board 36, which includes various sensor electronics 78. For example, pressure transmitter 12 includes temperature sensor 80, such as a thermistor or Platinum Resistance Thermometer (PRT), as is typically included in pressure transmitters. Temperature sensor 80 is positioned to determine the ambient temperature around sensor 24 within sensor module 28. In another embodiment, temperature sensor 80 is deposited on a flex circuit connected to circuit board 36 such that temperature sensor 80 can be positioned in close proximity to pressure sensor 24. Wiring 34 connects circuit board 36 with transmitter circuitry 22 within housing 30 (FIG. 1) of transmitter 12.

Thus, variations in the pressure signal generated by sensor 24 due to changed temperature conditions within module 28 can be compensated for temperature error by circuitry 22 such that the pressure of the process fluid is relayed accurately to control room 14 or LCD 26.

Heating devices 32A through 32F include lead wires (not shown for clarity) connecting to circuit board 36 such that heating devices 32A through 32F are in communication with transmitter circuitry 22 through wiring 34. Heating devices 32A and 32B are positioned on fill tube portions 50A and 50B of isolation tubes 46A and 46B, respectively. Heating devices 32C and 32D are positioned on isolation tubes 46A and 46B, respectively, nearer cell halves 54A and 54B. Heating devices 32E and 32F are positioned directly on cell halves 54A and 54B, respectively.

Sensor diaphragm 38 and electrodes 52A and 52B comprise first and second capacitors within sensor 24 that each produce capacitance signals as pressures P1 and P2 produce a pressure differential across diaphragm 38. The force associated with pressure P1 is transmitted from isolation diaphragm 48A to sensing diaphragm 38 by the fill fluid contained in isolation chamber 66A, isolation tube 46A, fill tube 50A and electrode 52A such that the pressure on the high side, or A side, of diaphragm 38 equals pressure P1. Likewise, the force associated with pressure P2 is transmitted from isolation diaphragm 48B to sensing diaphragm 38 by the fill fluid contained in isolation chamber 66B, isolation tube 46B, fill tube 50B and electrode 52B such that the pressure on the low side, or B side, of diaphragm 38 equals pressure P2. The fill fluid is introduced into sensor 24 through fill tube portions 50A and 50B of isolation tubes 46A and 46B through a precise filling process that occurs at the factory during assembly. Fill tubes 50A and 50B are crimped and sealed at the factory to prevent fill fluid leakage. The capacitance between diaphragm 38 and first electrode plate 52A and the capacitance between diaphragm 38 and second electrode plate 52B change as the curvature of diaphragm 38 changes due to the influence of the fill fluid. Pressure sensor 24 thus produces dual capacitance signals, which helps reduce error produced by sensor 24. Capacitance between diaphragm 38 and one of electrode plates 52A or 52B will increase while the other will decrease. The change in capacitance of each capacitor due to the pressure change is measured by circuit board 36 and transmitter circuitry 22 as an indication of the change in magnitude of the differential pressure between pressures P1 and P2. The present invention is also applicable to pressure sensors that produce only single capacitance signals.

Generally speaking, capacitance is an indication of how much charge a capacitor can store in relation to plate voltage. The capacitance C is proportional to the area A of the electrode plates and the dielectric constant $\varepsilon$ of the material between the electrode plates, and inversely proportional to the distance X between the electrode plates, as shown in Equation (1).

$$C = \frac{\varepsilon A}{X} \quad \text{Equation (1)}$$

The area A of the capacitors is fixed by the size of sensor 24 and electrode plates 52A and 52B. The magnitude of the dielectric constant $\varepsilon$ of the fill fluid is determined by the fill fluid used within sensor 24. Thus, a physical change in the position of sensing diaphragm 38 is required to change distance X so that pressure sensor 24 will produce a change in the electric pressure signal, which is provided by movement of the fill fluid. In typical pressure cells, the depth of internal cavity 74 (e.g. the distance between the rim of insulator 56A and the trough of insulator 56A) is about 0.004 inches (~0.01 cm). Thus, sensing diaphragm 38 need only move on the order of millionths of an inch to produce a change in the electronic sensor signal. Under typical operating conditions when sensing the pressure of a process fluid, distance X is changed by movement of the fill fluid within isolation tubes 46A and 46B as affected by pressures P1 and P2. The thermal-based sensor diagnostic system of the present invention effects a controlled movement of sensing diaphragm 38 using one of heating devices 32A through 32F such that verification of mechanical operation of sensor 24 can be performed by transmitter circuitry 22 and control room 14 (FIG. 1).

Heating devices 32A through 32D are positioned within sensor module 28 to cause a local thermal expansion of the fill fluid. The expanding fill fluid creates a true pressure increase within the contained volume of the cell half associated with the heating device being used. This pressure increase causes a physical change in the position of sensor diaphragm 38 such that a true pressure signal is generated by circuitry 22 (FIG. 1) that can be used to verify operation of sensor 24. Heating devices 32A and 32B are positioned on fill tubes 50A and 50B to heat and expand the sensor fill fluid. Likewise, heating devices 32C and 32D are positioned on isolation tubes 46A and 46B to heat and expand the fill fluid. Heating devices 32E and 32F are positioned on sensor cell halves 54A and 54B to cause a localized deformation or contortion in cell halves 54A and 54B large enough to deflect sensing diaphragm 38 within sensor 24.

The heat from a heating device 32A-32D causes a thermal expansion in the fill fluid that far exceeds the thermal expansion of the isolation tubes, fill tubes or cell halves. For example, the thermal expansion of a typical silicone oil fill fluid is approximately thirty times that of typical metallic materials used to fabricate a pressure sensor module. As described above, it only takes a small movement of the sensing diaphragm to change the pressure signal. Thus, only a small change in the volume of the fill fluid is required from the thermal expansion. Thus, the heat required to induce thermal expansion of the fill fluid to cause a change in the pressure signal does not cause a significant thermal expansion of the isolation tubes, fill tubes or cell halves. In another embodiment of the invention, bulbs of additional fill fluid are connected to fill tubes 50A and 50B, and heating devices 32A and 32B, respectively, are connected to the bulbs. Thus, thermal energy from devices 32A and 32B is concentrated around a larger volume of fill fluid such that a larger change in volume is produced. The volume of the bulbs, however, is not large enough to affect the pressure accuracy of the measurement system.

Localized heating of the fill fluid provides sufficient thermal expansion that registers with sensor diaphragm 38. The change in volume $\Delta V$ of a fill fluid equals the volume $V$ of the fluid multiplied by the change in temperature $\Delta T$ of the fluid and the coefficient of thermal expansion of the fluid $\alpha$, as shown in Equation (2).

$$\Delta V = \Delta T * V * \alpha \qquad \text{Equation (2)}$$

The change in volume $\Delta V$ is related to the portion of the total oil volume $V$ being heated. For example, volume $V$ can be estimated as the volume within each fill tube 50A or 50B, while the coefficient of thermal expansion $\alpha$ is determined by properties inherent in the fill fluid. The change in temperature $\Delta T$ is determined by the thermal input of the implemented heating devices chosen from heating devices 32A and 32B. The resulting change in volume $\Delta V$ of the fill fluid determines the deflection X (Equation (1)) of sensor diaphragm 38, which depends primarily on the effective stiffness $S_{\mathit{eff}}$ of both sensor diaphragm 38 and the isolator diaphragm, such as diaphragms 48A and 48B. For this system, the resulting pressure due to a volume change is calculated using Equation (3).

$$\Delta P = \Delta V * S_{\mathit{eff}} \qquad \text{Equation (3)}$$

The effective stiffness $S_{\mathit{eff}}$ is used in Equation (3) because the deflection of sensor diaphragm 38 from expansion of the fill fluid depends on the stiffness of both the sensor diaphragm 38 and isolation diaphragms 48A and 48B. As fill fluid is heated, both diaphragms expand or bow outward. Isolation diaphragms 48A and 48B are, however, much less stiff than sensor diaphragm 38 such that the influence on isolation diaphragms 48A and 48B is greater. For example, on a typical low range capacitive pressure sensor having an upper pressure range of 3 inches of water (~750 Pa), sensor diaphragm 38 is two and a half times stiffer than isolation diaphragm 48A or 48B. For a typical high range capacitive pressure sensor having an upper pressure range of 2000 pounds per square inch (psi) (~14 MPa), sensor diaphragm 38 is eleven thousand times stiffer than isolation diaphragm 48A or 48B. As such, isolation diaphragms 48A and 48B are more likely to deflect and absorb the majority of the thermal expansion of the fill fluid. Displacement of isolation diaphragms 48A and 48B, however, does not affect sensor diaphragm 38 and thus does not affect the output of sensor 24.

In low and mid range pressure sensors, however, heating of the fill fluid by a heating device induces enough thermal expansion in the fill fluid to provide an effective means to move sensor diaphragm 38. For example, on a typical mid range pressure sensor having an upper pressure range of 250 inches of water (~62 kPa), sensor diaphragm 38 is forty-eight times stiffer than isolation diaphragms 48A or 48B. Experimentation has shown thermally created pressures of 0.5 to 1 inch of water (~25 Pa to ~250 Pa) can be created causing a deflection of sensor diaphragm 38 that will cause pressure sensor 24 to generate a signal detectible by circuitry 22. Accordingly, the positioning of heating devices 32A and 32B and 32C and 32D on isolation tubes 46A and 46B provide suitable means for verifying the operation of low and mid range pressure sensors by heating the fill fluid to cause a thermal expansion. Likewise, heating devices 32E and 32F, also provide suitable means for adjusting the position of diaphragm 38. Heating devices 32E and 32F also provide a means for verifying operation of higher range pressure sensors.

Difficulties in causing movement of sensor diaphragm 38 with expansion of the fill fluid due to displacement of the relatively more flexible isolation diaphragms 48A and 48B, such as in high range pressure sensors, can be overcome by providing direct heating of cell halves 54A and 54B. High range pressure sensors include sensing diaphragms that are much stiffer than their counterpart isolation diaphragms. One embodiment of the present invention induces a deformation into cell halves 54A and 54B by applying heat from heating devices 32E or 32F to cause a thermal expansion of sensor 24. The heat from heating devices 32E or 32F is primarily absorbed by cell halves 54A or 54B. The heat absorbed by cell halves 54A or 54B causes non-uniform thermal expansion of cell halves 54A and 54B that disturbs the symmetry of sensor 24. Sensor diaphragm 38 is typically stretched and welded across cell halves 54A and 54B such that distortion of cell halves 54A and 54B causes movement of sensor diaphragm 38, particularly around joint 72. This induced movement of sensor diaphragm 38 produces a false pressure signal, a pressure signal not representative of any actual pressure change, to verify operation of sensor 24. Each method of affecting movement of sensor diaphragm 38 for the present invention depends on the available thermal input from heating devices 32A-32F.

In other embodiments of the invention, transmitter 12 is provided with temperature sensors to monitor the heat output of heating devices 32A-32F such that the thermal input into the fill fluid can be monitored to accurately assess the change in the pressure signal. For example, temperature sensor 89 is provided on heating device 32C to monitor the temperature generated along isolation tube 46A. Thus, transmitter circuitry 22 can use the output of sensor 89 to verify operation of the heating device and calibrate the magnitude of the pressure signal change to the magnitude of the heat input into the fill fluid. In various embodiments, the local temperature at isolation tube 46A can rise to 100° F. (~38° C.) from thermal output of heating device 32C.

Figure 3:
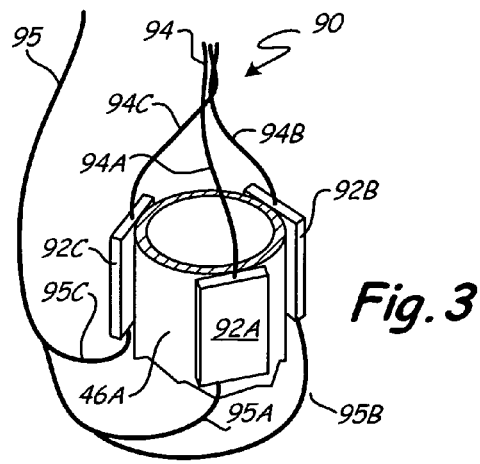
FIG. 3 shows a first embodiment of a heating device for use in a thermal-based sensor diagnostic system of the present invention wherein the heating device comprises a plurality of resistors.

FIG. 3 shows a first embodiment of a heating device suitable for use with the present invention. Heating device 90 is comprised of a plurality of resistors 92A, 92B and 92C that are disposed about the outer surface of isolation tube 46A. Resistors 92A, 92B and 92C draw current from circuit board 36 or another source such that heat is generated and dissipated as the current passes through. The heat thermally expands the fill fluid present inside isolation tube 46A such that diagnostics of the present invention can be performed. In the embodiment shown, heating device 90 comprises three resistors, but any number can be used depending on their size and resistance. Resistors 92A, 92B and 92C are distributed equally about the perimeter of isolation tube 46A to provide maximum exposure of the resistors to the surface of isolation tube 46A. Resistors 92A-92C can be affixed to isolation tube 46A by any means suitable for efficiently transferring heat from the resistors to the isolation tube. For example, highly conductive glue may be used in one embodiment. In other embodiments, other means such as soldering or banding may be used. Resistors 92A, 92B and 92C are connected in parallel and include lead wires 94A, 94B and 94C, and 95A, 95B and 95C that are connected to wires 94 and 95, respectively. Wires 94 and 95 are connected to circuit board 36. Resistors 92A-92C may comprise any suitable resistive material as is commercially available and may be of any suitable resistance to provide the desired heat output and that is compatible with circuit board 36. However, in other embodiments, fabricated resistance heaters may be used.

Figure 4A:
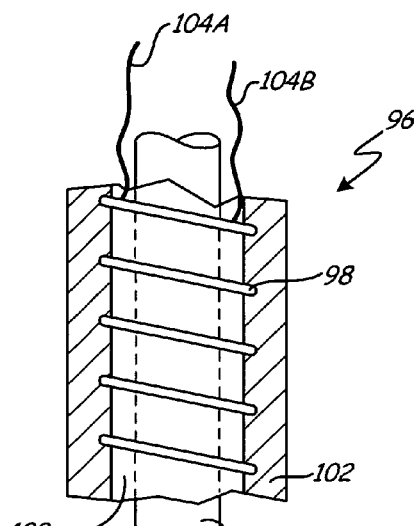
FIG. 4A shows a second embodiment of a heating device for use in a thermal-based sensor diagnostic system of the present invention wherein the heating device comprises a resistance wire coil.

FIG. 4A shows a second embodiment of a heating device suitable for use with the present invention. Heating device 96 comprises resistance wire coil winding 98, isolation sleeve 100 and insulation sleeve 102, which are concentrically wrapped around fill tube 50A. Insulation sleeve 102 is shown cut-away in FIG. 4A to show isolation sleeve 100 and coil 98. In one embodiment of the invention, fill tube 50A comprises a 0.065 inch (~0.165 cm) diameter steel tube. Wire coil winding 98 may comprise any suitable resistance wire as is commercially available. In one embodiment, winding 98 is comprised of a nickel-chromium alloy wire that is commonly used to produce resistance elements. The ends of coil winding 98 are connected to lead wires 104A and 104B, which are connected to circuit board 36. Lead wires 104A and 104B draw current from circuit board 36. The resistance of the wire produces heat as the current is passed through coil 98. Heat is conducted to the fill fluid inside fill tube 50A through isolation sleeve 100 such that the fill fluid thermally expands and diagnostics of the present invention can be performed.

Transmitters are used in a wide variety of industries, where they are potentially exposed to environments where dangers from explosion exist, such as gas refineries. Coil winding 98 poses a potential ignition point when current is conducted through it, as the potential for high temperatures exists. Thus, insulation sleeve 102 is provided to reduce surface temperature from winding 98 to maintain the intrinsic safety of transmitter 12. In one embodiment, insulation sleeve 102 prevents the surface of fill tube 50A from reaching approximately 200° C. (~392° F.) such that a T4 rating is achieved. Insulation sleeve 102 also increases the efficiency of heating device 96 by concentrating heat around the fill tube 50A, which is grounded external to transmitter 12. Isolation sleeve 100 comprises a thin layer of a material to isolate fill tube 50A from winding 98. In one embodiment, isolation sleeve 100 comprises a 0.020 inch (~0.051 cm) thick layer of ceramic material, although any suitable material having high thermal conductivity may be used. Insulation sleeve 102 covers the outside of winding 98 to provide a barrier to the ambient air surrounding sensor 24. In one embodiment, insulation sleeve 102 comprises any material suitable for providing electrical and thermal insulation, such as a rubber or plastic sleeve or coating. Together, isolation sleeve 100 and insulation sleeve 102 provide a barrier to coil winding 98 from sensor 24 and the rest of sensor module 28.

Figure 4B:
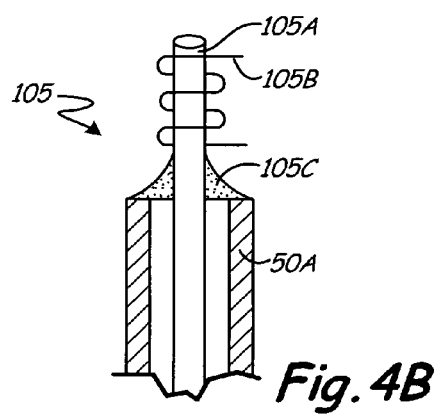
FIG. 4B shows a third embodiment of a heating device for use in a thermal-based sensor diagnostic system of the present invention wherein the heating device comprises a wire resistor wound around a copper wire brazed into a fill tube.

FIG. 4B shows a third embodiment of a heating device suitable for use with the present invention, in which resistive heating device 105 is placed inside of fill tube 50A. Heating device 105 comprises wire 105A, coil 105B and braze 105C. Braze 105C secures wire 105A to fill tube 50A. Coil 105B is wound around a first end of wire 105A that is positioned outside of fill tube 50A. A second end of wire 105A is positioned inside of fill tube 50A and is submerged in the fill fluid. In one embodiment of the invention, coil 105B is comprised of a highly electrically conductive material such as a nickel-chromium alloy, and wire 105A is comprised of a highly thermally conductive material such as copper. Coil 105B is electrically energized to resistance heat wire 105A. Heat is then efficiently conducted to the interior of fill tube 50A through wire 105A. As such, heat is directly imparted into the fill fluid, increasing heat transfer efficiency by eliminating the need to transfer heat across fill tube 50A. Additionally, the need for using high a pressure electrical feed-through to electrically power an internal heating device is eliminated.

In another embodiment, the heating devices of the present invention comprise resistance heating elements that have a filament positioned within a bulb, similar to a light bulb, and are, thus, particularly well-suited for placement within fill fluid inside fill tubes 50A and 50B or isolation tubes 46A and 46B. In one embodiment, lead wires for such resistance heating elements are directed out of fill tube 50A through the isolated seals. The thermal output of the various resistive heating elements of the present invention, no matter their design, depends on a power source being provided from circuit board 36 or another source.

Figure 5:
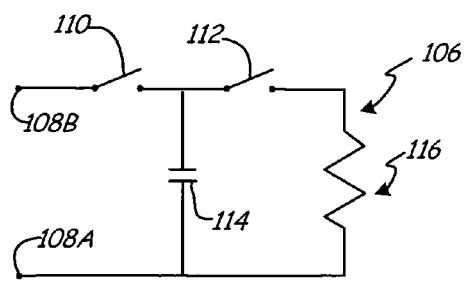
FIG. 5 shows a control circuit including a heating device and a capacitor that is connected to transmitter circuitry to power the diagnostic system of the present invention.

FIG. 5 shows an electrical schematic of a circuit for drawing power from a transmitter to supply the thermal-based diagnostic system of the present invention. Circuit 106 comprises terminals 108A and 108B, first switch 110, second switch 112, capacitor 114 and heating device 116. Heating device 116 comprises any resistive heating device suitable for use with the present invention, such as device 90, device 96 or some other resistive heating element. Heating device 116 is connected through lead wires, such as wires 94 and 95 or wires 104A and 104B, to first terminal 108A and second switch 112. Second switch 112 is connected to first switch 110, which is connected to second terminal 108B. Terminals 108A and 108B are connected to circuit board 36 such that a closed series circuit is formed. Capacitor 114 is connected to circuit 106 between switches 110 and 112 to form a shunt around heating device 116. As such, circuit 106 is connected with power supply 18 from control loop 16.

Circuit 106 operates in two modes. In the first mode, both switches 110 and 112 remain open and circuit 106 has no effect on normal operation of sensor 24. In the second mode, circuit 106 begins a sequence that will ultimately deliver power to heating device 116. The second mode is a two step process. In the first step, switch 110 is closed to begin charging capacitor 114 such that energy is stored on capacitor 114. For example, many transmitters operate at 12 volts over a 4 to 20 mA HART® network. In such a system, transmitter circuitry 22 requires 4 mA of current for quiescent operation, when no communication is required over control loop 16. The zero to full scale pressure signal is represented by the 4 to 20 mA signal, and is what is communicated over control loop 16. Additionally, the HART® digital protocol can also communicate over control loop 16.

In the first step, transmitter 12 temporarily stops communicating the 4 to 20 mA signal. This energy, normally used for communication to control loop 16, is now diverted to charge capacitor 114. The actual energy diverted to capacitor 114 is dependent upon circuit design efficiencies and other factors. One example is to charge capacitor 114 with 12 mA for 200 seconds. For a 1 Farad capacitor, the final voltage across capacitor 114 would be approximately 2.4 volts, resulting in approximately 5.76 Joules of energy being stored on capacitor 114, as are determined by known electrical relationships.

In the second step, switch 110 is opened. When it is desired to diagnose the operation of sensor 24, switch 112 is closed to discharge the energy stored on capacitor 114 to heating device 116. The resistance of heating device 116 is chosen to rapidly discharge capacitor 114 in several seconds. This rapid discharge causes a rapid rise in heat providing the necessary oil expansion and resulting pressure pulse In other embodiments, capacitor 114 can be continuously slowly charged therefore becoming available to perform a diagnostic on demand. For example, first switch 110 may remain closed and terminals 108A and 108B may be connected to transmitter circuitry 22 through a current regulating device, as is known in the art. The benefit of this embodiment is that transmitter 12 does not have to be taken off-line to charge capacitor 114. In other embodiments, switches 110 and 112 are electronic switches digitally controlled by transmitter circuitry 22.

In other embodiments, discharging current from capacitor 114 can be directed to heating device 116 using a current regulating circuit. Energy stored in capacitor 114 by any means powers heating device 116 where it is dissipated as thermal energy, thus causing thermal expansion of a fill fluid or cell half that induces a deflection in sensor diaphragm 38. Using Joule's law, the magnitude of the thermal energy Q available from heating device 116 can be calculated from the resistance R of heating device 116, the amount of current i that can be delivered to heating device 116 from capacitor 114, and the length of time t that the current is supplied to heating device 116, as indicated by Equation (4).

$$Q = i^2 R t \; [J] \qquad \text{Equation (4)}$$

In some embodiments, resistors having a resistance of approximately 5 to 10 Ω are used. In one other embodiment of the invention capacitor 114 comprises a supercapacitor as is known in the art and is commercially available. Generally, supercapacitors have greater capacitance than conventional capacitors in smaller packaging due to their use of double-layer electrodes with electrochemical dielectrics. Background and construction of such supercapacitors is described in greater detail in the following references: U.S. Pat. No. 5,380,341 by Mathews et al., U.S. Pat. No. 6,512,667 by Shiue et al., U.S. Pat. No. 5,426,561 by Yen et al., U.S. Pat. No. 7,170,260 by Thrap, and U.S. Pat. No. 4,414,607 by Sekido et al. Thus, the term "supercapacitor" refers to any known high capacity, compact, capacitor, including "ultracapacitors."

Figure 6:
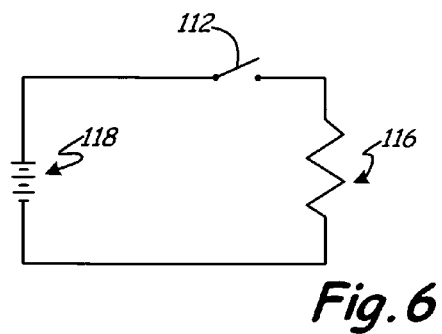
FIG. 6 shows a control circuit including a heating device and a battery that is connected to transmitter circuitry to power the diagnostic system of the present invention.

FIG. 6 shows another embodiment of the invention in which power is supplied to heating device 116 from dedicated battery 118 located in sensor housing 30 that is controlled by transmitter circuitry 22. For example, typical low voltage batteries used in industrial process transmitters for wireless networks may be used. Such batteries have small packaging such that they fit inside electronics housing 30 and provide power such that approximately 1500 diagnostic tests could be performed, depending on the resistance of the heating element used. With respect to FIG. 5, capacitor 114 is replaced with battery 118, therefore also eliminating the need to charge the battery. Thus, the invention provides a variety of embodiments in which circuitry 22 controls current to heating elements to provide a pulsed heat input to sensor 24. In other embodiments of the invention, circuitry 22 can be directly connected to an external power supply, such as would be available in typical commercial or industrial facility, to power heating device 116 in lieu of battery 118.

Figure 7:
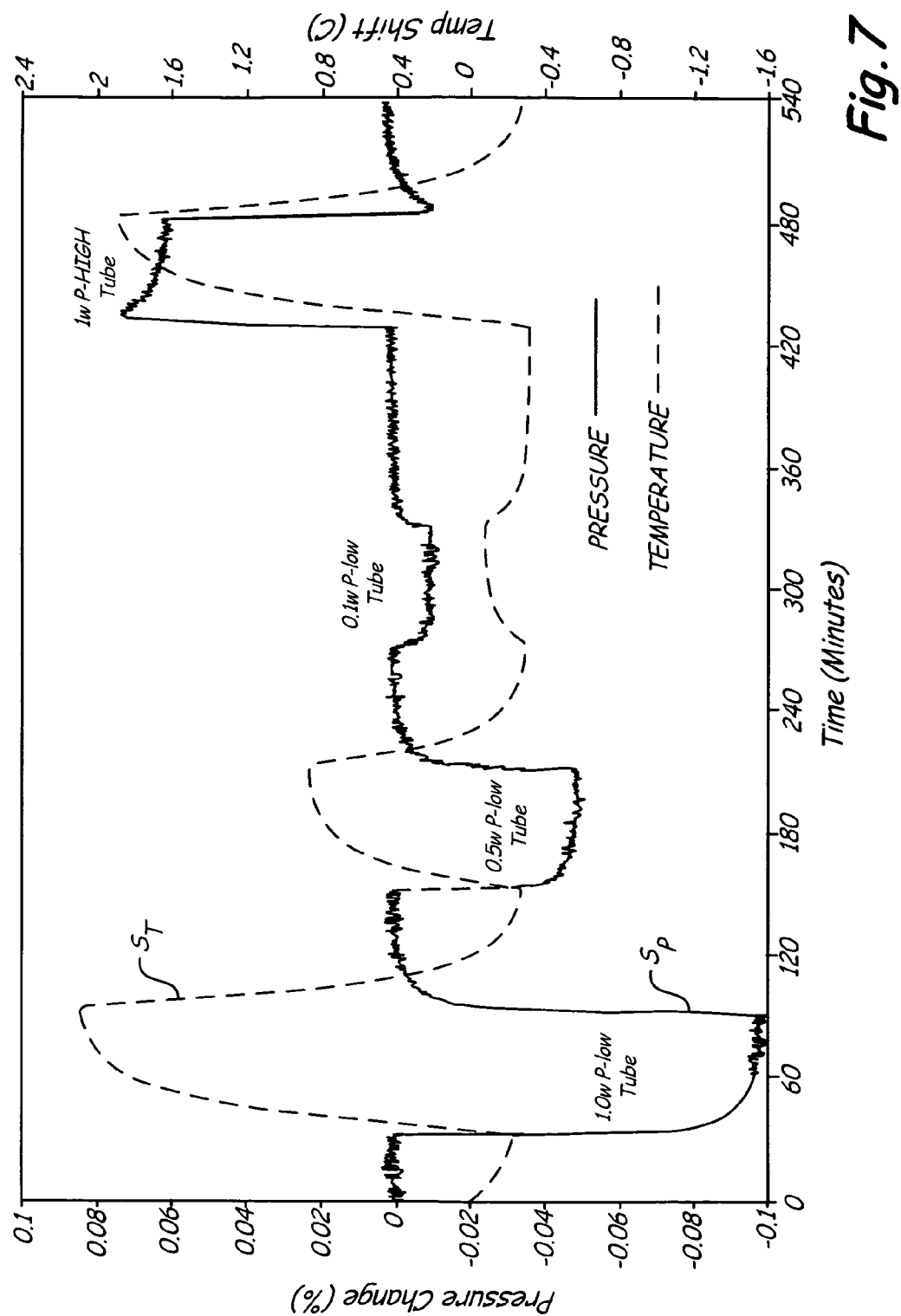
FIG. 7 shows a graph of pressure signal output from a pressure sensor in relation to thermal output of a heating device positioned within a sensor module.

FIG. 7 shows a graph of experimental data showing a pressure signal $S_P$ from pressure sensor 24 in relation to a temperature signal $S_T$ from a temperature sensor positioned within sensor module 28, such as sensor 80. Heat energy was supplied to fill tubes 50A and 50B using an external heating source, such as a resistive heating device similar to that of devices 90 and 96, to replicate placement of heating devices 32A and 32B. The left vertical axis shows the percent change in pressure with respect to the pressure range limit of sensor 24. The right vertical axis shows temperature shift in degrees Celsius. The horizontal axis shows time as various power pulses were supplied to the heating devices. Although FIG. 7 shows the heating device being powered for approximately sixty minutes, meaningful pressure and diagnostic information can be obtained within seconds before temperature sensor 80 registers a temperature change in module 28, which greatly reduces the power need of the diagnostic system. FIG. 7 shows the pressure sensor signal $S_P$ being compensated for temperature based on temperature sensor 80 and calculations performed by circuitry 22, as is indicated in FIG. 7 by the change in slope of the peaks and troughs of the pressure signal $S_P$ after the heat energy has been applied to the fill fluid for a lengthy amount of time, usually minutes.

Starting from the left in FIG. 7, in the first input, 1 Watt of power was supplied to the low side fill tube, which resulted in the temperature signal $S_T$ rising approximately 2.5 degrees from its baseline position. The low side fill tube corresponds to heating device 32A connected to fill tube 50A. The pressure signal $S_P$ shows a negative reading indicating a change in pressure of about 0.1 percent of the range limit of the sensor. In the second input, ½ Watt of power was supplied to the low side fill tube, which resulted in the temperature signal $S_T$ rising approximately 1.1 degrees from its baseline position. The pressure signal $S_P$ shows a negative reading indicating a change in pressure of about 0.05 percent. In the third input, 0.1 Watt of power was supplied to the low side fill tube, which resulted in the temperature signal $S_T$ rising approximately 0.2 degrees from its baseline position. The pressure signal $S_P$ shows a negative reading indicating a change in pressure of about 0.01 percent. In the fourth input, 1 Watt of power was supplied to the high side fill tube, resulting in the temperature signals $S_T$ rising. The pressure signal $S_P$ shows a positive change in pressure because the heat input originates from the high-side fill tube. The high side fill tube corresponds to heating device 32B connected to fill tube 50B.

The experimental data confirms that the pressure sensor responds to both positive and negative changes in pressure. -Thus, inducing change in a pressure signal output from a thermal input into module 28 verifies operation of sensor 24. However, knowing the thermal input into the system based on control of the power from the transmitter circuitry and the temperature from a temperature sensor, such as sensor 80 on circuit board 36 or sensor 89 on heating device 32C, the corresponding change in pressure can be measured or calculated. The actual change in pressure indicated by the pressure sensor can be compared to the expected result to diagnose potential problems or failures within pressure transmitter 12 (FIG. 1), as is discussed with reference to FIGS. 8A-9F. The experimental data also confirms that a relationship exists between an increase in temperature and an increase in pressure. For example, the disclosed embodiment shows a linear relationship between temperature increase and pressure increase. Such relationships can be used to verify calibration of the pressure sensor, as discussed with reference to FIG. 10.

Figure 8A:
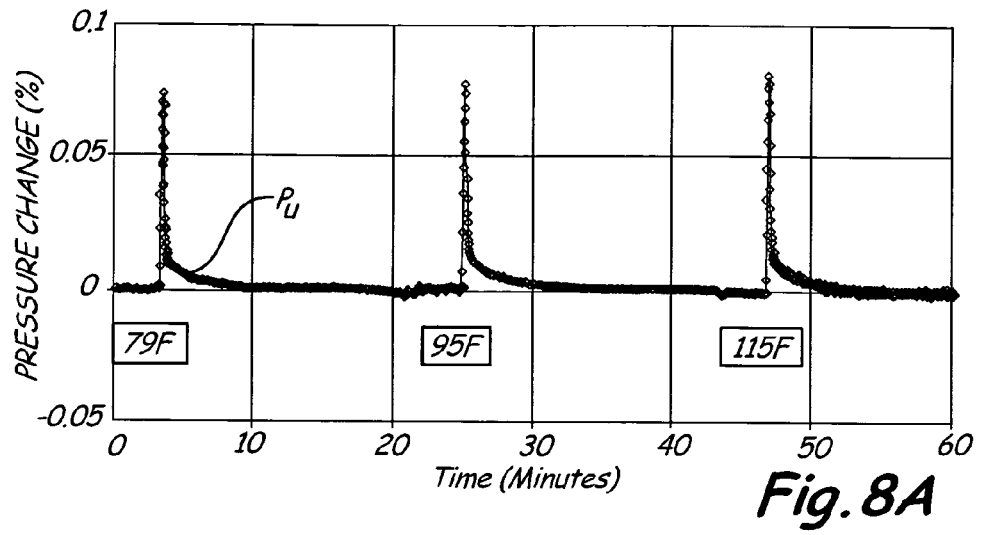
FIGS. 8A and 8B show graphs of pressure signal outputs for pressure sensor having a clean process isolation diaphragm and a caked isolation diaphragm.
Figure 8B:
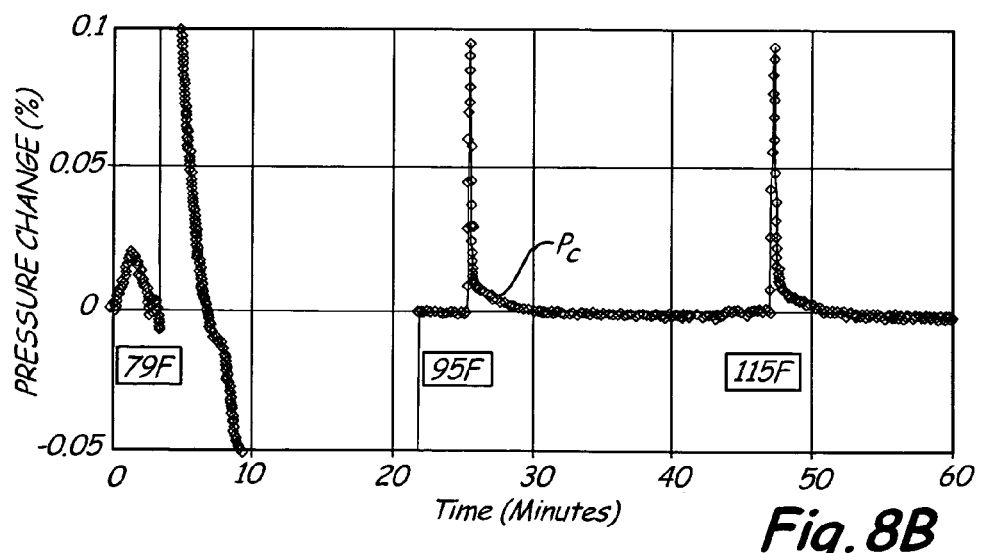

FIGS. 8A and 8B show graphs of an experiment in which a thermal-based diagnostic system of the present invention is used to diagnose a caked process isolation diaphragm. FIG. 8A shows a graph of thermally induced pressure signal output $P_U$ for a pressure transmitter having a clean process isolation diaphragm. FIG. 8B shows a graph of a thermally induced pressure signal output $P_C$ for a pressure transmitter having an isolation diaphragm that is caked with a process fluid. For the experiment conducted, the caked isolation diaphragm was coated with a layer of chocolate, which undergoes a phase change over a range of temperatures. FIGS. 8A and 8B show pressure measurements taken at three different temperatures, 79° F. (~26.1° C.), 95° F. (~35° C.) and 115° F. (~46.1° C.), which corresponds to the chocolate coating transitioning from a solid to a liquid.

As shown in FIG. 8A, pressure signal output $P_U$ increases as the temperature of the fill fluid between the sensor diaphragm and the isolation diaphragm within the pressure transmitter increases due to thermal input from a thermal-based diagnostic system. Specifically, pressure signal output $P_U$ increases about 0.07% for an increase in temperature of approximately 16° F. (~8.9° C.) to approximately 20° F. (~6.7° C.), as would be expected due to thermal expansion of the fill fluid within the pressure transmitter. As the temperature of the fill fluid is heated, the fill fluid expands to deflect the isolation diaphragm and the sensor diaphragm within the transmitter. The change in position of the sensor diaphragm shows up as a change in signal $P_U$, which increases as the temperature of the fill fluid increases.

As shown in FIG. 8B, pressure signal output $P_C$ increases as the temperature of the fill fluid increases. The magnitude of the change in pressure signal output $P_C$ corresponds to the phase of the obstructing chocolate. For example, at 95° F. (~35° C.) and 115° F. (~35° C.) pressure signal output $P_P$ increases approximately 0.1% because the coating on the isolation diaphragm slightly increases the stiffness of the isolation diaphragm. Due to the increased stiffness of the isolation diaphragm, the thermally expanded fill fluid is slightly inhibited from deflecting the isolation diaphragm, which results in a greater deflection of the sensor diaphragm. Because the chocolate coating is soft and somewhat viscous the isolation diaphragm still deflects and the sensor diaphragm does not absorb all of the thermal expansion of the fill fluid. At 79° F. (~26.1° C.), however, the chocolate is solidified such that the isolation diaphragm becomes rigid and unable to deflect under the pressure exerted by the thermally expanded fill fluid. As such, the sensor diaphragm absorbs almost all of the thermal expansion of the fill fluid induced by the thermal-based diagnostic system. As can be seen in FIG. 8B, the change in pressure signal output $P_C$ at 79° F. (~26.1° C.) is many times greater than the change in pressure signal output $P_C$ at 95° F. (~35° C.) and 115° F. (~35° C.) such that the scale of FIGS. 8A and 8B do not show the peak increase in output $P_C$. The increase of pressure signal output $P_C$ at 79° F. (~26.1° C.) is approximately 2.6%, which is approximate thirty-five times greater than the increase at 95° F. (~35° C.) or 115° F. (~35° C.). Thus, a caked isolation diaphragm produces a change in a thermally-induced pressure signal output from what would be expected from an un-caked isolation diaphragm. Thus, FIGS. 8A and 8B illustrate one method by which the thermal-based diagnostics of the present invention are used to diagnose specific deficiencies or problems with pressure transmitter systems.

FIGS. 9A through 9F show various graphs of pressure signal output corresponding to various diagnosis of the pressure sensor. Each figure displays the power input and corresponding pressure output from one half of the pressure sensor. The diagnostic can be repeated on the opposite half of the sensor. FIG. 9A indicates a pressure sensor signal in response to a power input to a heating device for a properly functioning pressure sensor. A constant power pulse is provided to a heating device for a limited amount of time. The power to the heating device dissipates as heat is input to the fill fluid, causing a thermal expansion of the fill fluid as the temperature rises. The expanding fill fluid exerts an increasing pressure on the sensing diaphragm. When the power input is stopped the pressure signal returns to the baseline pressure as the thermal energy within the fill fluid dissipates. The pressure signal produces as saw-tooth shaped signal indicating an increase and decay of the pressure experienced at the sensing diaphragm, thus indicating a properly functioning sensor.

FIG. 9B indicates a pressure sensor signal in response to a power input to a heating device for a pressure sensor connected to a plugged process connection. Sometimes, the process fluid or some other contaminant builds up within the system. For example, an impulse pipe, typically a small diameter conduit, connecting a process fluid pipeline to a pressure transmitter flange may become plugged with oil or some other sludge. Alternatively, ice may accumulate in the system to block a passage. Thus, the pressure PI or P2 from the process fluid is prevented from being transmitted to the pressure transmitter. As such, fill fluid expanding under a thermal input will deflect the sensor diaphragm greater than as if the obstruction were not there, as the isolation diaphragm is prevented from moving by the plug or obstruction. Thus, all of the pressure buildup from the fill fluid expansion will be transmitted to the sensor diaphragm. The pressure signal will therefore rise to a level much larger than what the corresponding power input would normally cause the signal to rise to, such as in FIG. 9A. Thus, a saw-tooth signal having a magnitude greater than expected may be indicative of an obstructed process fluid orifice, passageway or the like. Likewise, a signal having a magnitude greater than expected may be indicative of a caked isolation diaphragm, as was discussed with reference to FIGS. 8A and 8B.

FIG. 9C indicates a pressure sensor signal in response to a power input to a heating device for a pressure sensor having a ruptured sensing diaphragm. Sometimes, it is possible for the sensor diaphragm, such as sensor diaphragm 38, to leak such that the fill fluid from one half of the sensor is no longer sealed from the other half of the sensor. In particular, in a differential pressure sensor, the sensor diaphragm divides fill fluid contained within the two sides of the sensor. Thus, a leak in the sensor diaphragm would permit fill fluid to crossover. As such, fill fluid expanding under a thermal input will begin to deflect the sensor diaphragm as if no hole were present in the sensing diaphragm. As the pressure on one side of the sensing diaphragm increases, however, the fill fluid will be forced through the leak to equalize the pressures on either side of the sensing diaphragm. The pressure signal will therefore begin to rise, but will peak below what the corresponding expected value shown in FIG. 9A, as the exchange of fill fluid through the leak equalizes the pressure. The larger the leak is, the smaller will be the deflection of the sensing diaphragm and the change in the pressure signal. Thus, a saw-tooth signal having a magnitude smaller than expected may be indicative of a ruptured sensor diaphragm.

FIG. 9D indicates a pressure sensor signal in response to a power input to a heating device for a pressure sensor having a low fill fluid volume. Sometimes, it is possible for fill fluid to leak out of the sensing system. As such, fill fluid expanding under a thermal input will have room to expand out of the hydraulic system resulting in the sensing diaphragm not moving or detecting a change in pressure. Similarly, if the hydraulic system was improperly filled and there was air sealed within the sensor system, the air would compress under the increased pressure of the expanding fill fluid. Additionally, there is less fill fluid in the isolation tube to expand. Thus, the pressure sensor signal will remain at the baseline pressure or will negligibly change, not reflecting any significant increase in pressure. Thus, a flat-line pressure output in response to a pulsed power input to a heating device may be indicative of a hydraulic system having a leak or the presence of air. Such a flat-line pressure output may also be indicative of an open process connection where a change in pressure of the process fluid results in no visible change to the pressure signal.

FIG. 9E indicates a pressure sensor signal in response to a power input to a heating device for a pressure sensor in which the isolation diaphragms have undergone hydrogen permeation. Sometimes, pressure transmitters are integrated into process control systems for which they were not originally intended. Isolation diaphragms are selected based on the types of process fluids they will contact when installed. For example, isolation diaphragms having gold plating are used when the process fluid is known to include hydrogen gas. Hydrogen gas is able to permeate typical steel isolation diaphragms. Steel isolation diaphragms contacting process fluids containing a hydrogen gas component will draw the hydrogen gas through the isolation diaphragm where it is absorbed by the fill fluid. Due to the increased volume of gas and fill fluid within the isolation tube, the isolation diaphragms begin to bow outward. As the fill fluid is heated from the heating devices, the fill fluid compresses the hydrogen gas within the fill fluid. Because of the hydrogen gas, the sensing diaphragm does not reflect a change in the pressure from the heated and expanded fill fluid, similar to the presence of air within the fill fluid as described with reference to FIG. 9D. Thus, the pressure sensor signal will remain at the baseline pressure or will negligibly change, not reflecting any significant increase in pressure. Thus, a flat-line pressure output in response to a pulsed power input to a heating device may be indicative of an isolation diaphragm undergoing hydrogen permeation.

FIG. 9F indicates a pressure sensor signal in response to a power input to a heating device for a pressure sensor connected to a ruptured isolation diaphragm. Sometimes, it is possible for isolation diaphragms, such as isolation diaphragms 48A or 48B, to rupture due to corrosion or mechanical damage. Particularly, it is possible for the isolation diaphragms to become damaged such that the fill fluid is no longer sealed inside the isolation tube. As such, fill fluid expanding under a thermal input will no longer be in an enclosed volume and created pressure will expand out through the damaged isolation diaphragm. The sensor diaphragm therefore will not detect an increase in pressure as the fill fluid escapes through the isolation diaphragm rather than exerting a pressure on the sensor diaphragm. Thus, the pressure sensor signal will remain at the baseline pressure or will negligibly change, not reflecting any significant increase in pressure. Thus, a flat-line pressure output in response to a pulsed power input to a heating device may be indicative of a ruptured isolation diaphragm.

Figure 10:
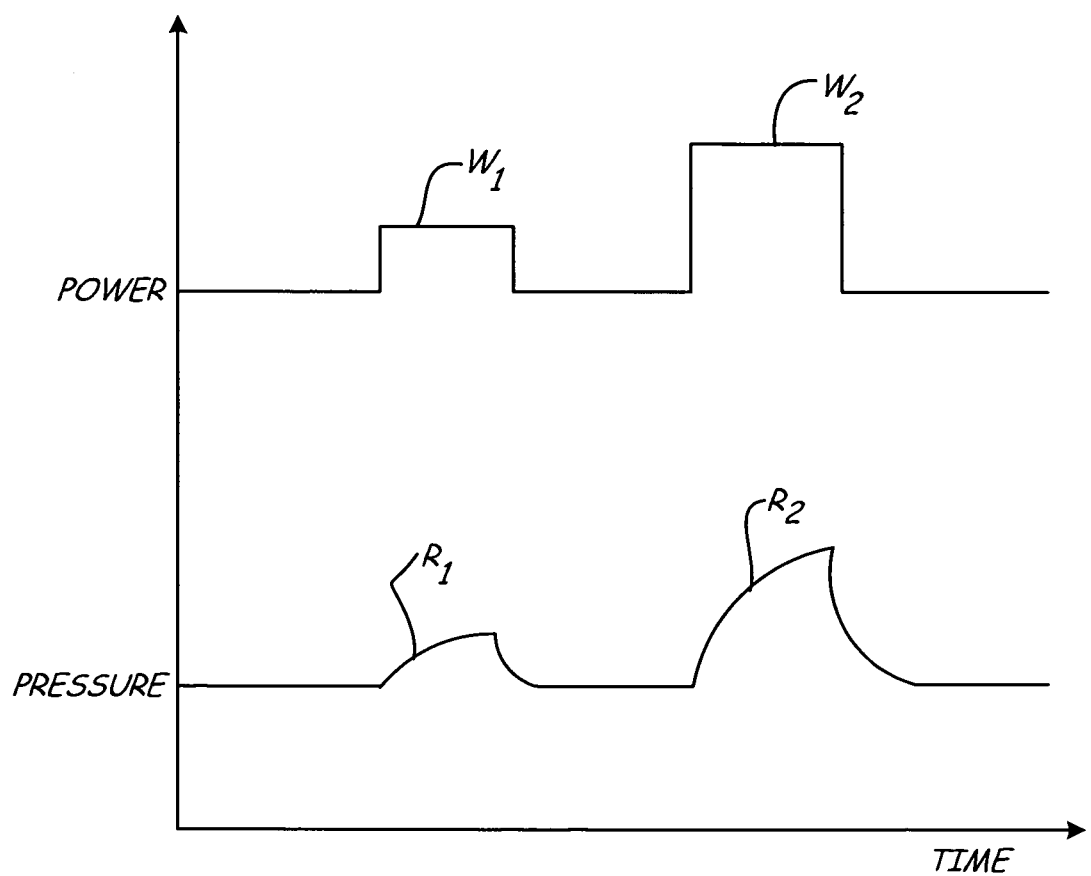
FIG. 10 shows a graph illustrating a process for verifying calibration of a pressure sensor.

FIG. 10 shows a graph illustrating a process for verifying calibration of a pressure sensor. FIG. 10 displays a series of power inputs into a heating device and a corresponding series of increases in a pressure signal output. Power pulses, such as wattages $W_1$ and $W_2$, are applied to heating devices within a pressure sensor module. Wattages $W_1$ and $W_2$ induce pressure responses $R_1$ and $R_2$ in a pressure signal output of a pressure sensor within the pressure sensor module. Because of the known relationship between power input and pressure signal output for the thermal-based diagnostic system of the present invention, the change in magnitude of the resulting pressure signal responses $R_1$ and $R_2$ should correspond to the change in magnitude of wattages $W_1$ and $W_2$. As was discussed with reference to FIG. 7, the change in magnitudes of pressure signal responses $R_1$ and $R_2$ changes linearly with change in magnitudes of wattages $W_1$ and $W_2$ for one embodiment of the invention. The magnitudes of wattages $W_1$ and $W_2$ are known based on, for example, the magnitude of the resistors in the heating device and the magnitude of the current supplied to the resistors. Thus, by inducing a series of temperature changes with known power pulses, the resulting pressure signal responses can be compared to an expected pressure response curve to verify that the pressure sensor is properly calibrated. If pressure signal responses $R_1$ and $R_2$ do not fit the expected relationship or curve, it is an indication that the pressure sensor is out of calibration. In other embodiments, the magnitude of temperatures resulting from the power pulses can be used to correlate the changes in pressure signal responses $R_1$ and $R_2$.

Transmitter circuitry 22 (FIG. 1) includes software routines that perform the various operations for executing the verification process discussed with reference to FIGS. 9A-10. For example, transmitter circuitry 22 activates the heating devices, verifies operation of the heating devices with sensor 89 (FIG. 2), verifies output of sensor 24 in response to activation of the heating devices, and compares the output of sensor 24 with the output of sensor 89. To further enhance the reliability of the diagnostics, temperature sensor 89 is used to monitor output and operation of the heating devices, while temperature sensor 80 is incorporated in circuit board 36 to compensate the pressure signal for temperature errors. Comparison of the pressure sensor signal can be verified before temperature compensation occurs. For example, the thermal input from heating devices 32A-32F will cause an increase in the pressure signal before sensor 80 detects an increase in temperature within sensor module 28. Thus, temperature sensor 89 and the known power pulse input to the heating device can be used to derive the verification of sensor 24 before circuitry 22 begins to compensate the pressure signal based on input from sensor 80.

Transmitter circuitry 22 also includes software that coordinates operation of sensor 24 to sense a process pressure and operation of heating devices 32A-32F to verify operation of sensor 24. The verification process may run as a background operation during the course of routine functioning of transmitter 12, or may run as the primary function of transmitter 12, depending on how power is delivered to the heating devices and the routine used to activate the devices and other factors. For example, in one embodiment, power can be delivered to the heating devices through a supercapacitor that is charged through trickle current delivered from circuitry 22 or a battery such that transmitter 12 need not be taken offline. In such an embodiment, current can then alternately be applied to heating devices on the low pressure side of the sensor to produce small output signals from sensor 24 that fall within the error band of the baseline sensor signal, thus not interfering with the primary function of transmitter 12. Software programmed into circuitry 22 performs a signal processing technique to extrapolate the pattern from the pressure signal while the transmitter is still online to evaluate output of sensor 24. In other embodiments, transmitter 12 is taken offline and power is temporarily delivered to the heating devices or a capacitor and the verification process is conducted.

Transmitter 22 also includes software for enhancing utility of data generated by the thermal-based diagnostic system and for ensuring compliance of transmitter 12 with industry standards. In one embodiment of the invention, transmitter circuitry 22 includes Asset Management Solutions (AMS) software to produce, record and store data relating to diagnostic signals produced as a result of the thermal-based diagnostic system such that shifts in transmitter performance can be monitored. To reduce bandwidth consumption over control loop 16, discrete packages of data relating to performance shifts or asymmetrical performance of sensor 24 can be communicated to control room 14 rather than continuous streams of information. For example, the AMS software can store and transmit patterns in signal magnitude, time constant, wave shapes, or wave symmetry. These and other verification processes conducted by transmitter 12 are compatible with digital control systems that integrate Safety Instrumented System (SIS) and Safe Failure Fraction (SFF) protocols to verify that transmitter 12 produces a recognizable signal when the transmitter fails to ensure that operators of control system 10 are aware of the operating state of transmitter 12.

Operation of heating devices 32A-32F can be controlled either manually on demand, or automatically as needed. In one embodiment, heating devices 32A through 32F are activated locally by a user through an interface such as at LCD 26 to run the verification process. Once a diagnostic test is initiated, a user need not perform any subsequent tasks, preventing improper operation of the heating devices and facilitating ease of use. For example, activation of heating devices 32A-32F for too long a period can lead to unintended consequences. Producing too much heat within sensor module 34 may cause degraded accuracy of sensor 24 and the thermal-based diagnostic system, such as by circuit board 36. In other embodiments, initiation of heating devices 32A through 32F is activated automatically by control room 14 remotely through control loop 16. After the verification process is completed by circuitry 22, results are communicated to an operator in the form of an audible annunciation or a visual cue, such as over control loop 16 (FIG. 1) or through display 26 (FIG. 1).

The thermal-based sensor diagnostic system of the present invention provides a simple, reliable and accurate method for verifying both the operation and calibration of sensor 24. Operation of sensor 24 is verified by simply inducing a change in the pressure signal with a heat pulse from one of devices 32A-32F. Conversely, the response pressure signals can be used to verify operation of the verification system itself. Comparison of the magnitude of a series of heat pulses from devices 32A-32F to the changes in magnitude of the pressure signal are used to evaluate the calibration of sensor 24. Furthermore, advanced diagnoses can be performed, such as by sequentially performing diagnostics on the high side and low side of the pressure sensor, to determine 1) if the pressure sensor is operating correctly, 2) if the pressure sensor is calibrated, 3) if the external pressure connection is plugged, and 4) if the pressure sensor is damaged due to ruptured diaphragms, low oil, air within the oil, etc., such as discussed with respect to FIGS. 9A-9F. Heating devices 32A-32D cause a thermal expansion of fill fluid to produce a deflection of sensor diaphragm 38. Heating device 32E and 32F cause a distortion of cell halves 54A and 54B that produce a deflection of sensor diaphragm 38. As such, activation of heating devices 32A-32F produces a heat pulse that produces a change in the pressure signal generated by sensor diaphragm 38. In other embodiments, which will be discussed in greater detail with respect to FIGS. 11-12, heating devices are used to produce heat pulses that change the pressure signal by altering the properties of the fill fluid.

Figure 11:
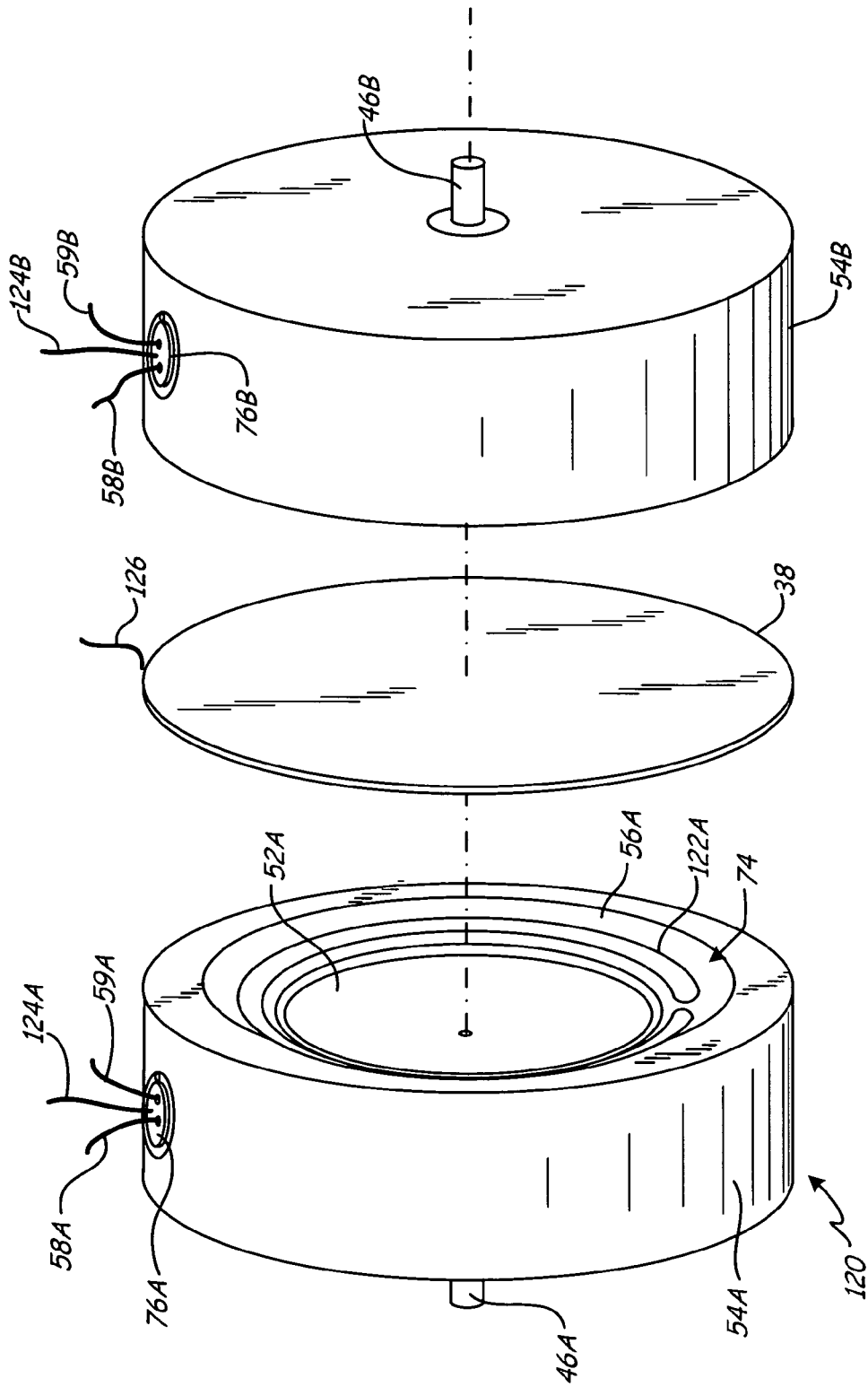
FIG. 11 shows an exploded perspective view of a pressure sensor cell according to the present invention having an integrated error compensation electrode and an integrated fill fluid heating system.

FIG. 11 shows an exploded view of 7-wire pressure sensor 120 of the present invention, including first cell half 54A, second cell half 54B and sensor diaphragm 38. First cell half 54A comprises first isolation tube 46A, first electrode 52A, first insulator 56A and first lead wires 58A and 59A, similar to that of sensor 24 of FIG. 2. Cell half 54A also includes an integrated error compensation electrode comprising electrode 122A, and an integrated fill fluid heating system including diagnostic wire 124A. Second cell half 54B includes second isolation tube 46B, second lead wires 58B and 59B, and second diagnostic wire 124B, as well as other components like that of cell half 54A not shown. When assembled, sensor diaphragm 38 is configured to be attached to the perimeters of cell halves 54A and 54B and includes lead wire 126. As such, cell-halves 54A and 54B are assembled to form 7-wire sensor 120.

For sensing pressure, sensor 120 operates similarly to sensor 24 in that a fill fluid is conducted into sensor 120 from isolation tubes 46A and 46B to fill interior cavity 74 on both sides of sensor diaphragm 38. Electrode plates within each of cell halves 54A and 54B, such as electrode 52A, form variable capacitance capacitors with sensor diaphragm 38. The capacitance of the capacitors changes as the fill fluid changes the distance between sensor diaphragm 38 and the electrode plates. Fill fluid within isolation tube 46A is influenced by an external pressure, such as from a process fluid, to affect a flexure of diaphragm 38. Specifically, the fill fluid causes sensor diaphragm 38 to curve near its center, as its perimeter is fixed against cell halves 54A and 54B. Sensor diaphragm 38, however, does not always deflect uniformly, e.g. parabolically, due to edge-bending moments caused by joining of sensor diaphragm 38 to the cell halves. For example, diaphragm 38 may remain substantially flat, but yielding or creeping moments in sensor diaphragm 38 may cause the edges of sensor diaphragm 38 to bend such that diaphragm 38 translates laterally toward cell half 54A. Sensor 120 is thus provided with additional electrodes for evaluating the position of sensor diaphragm 38. For example, error compensation electrode 122A comprises an additional electrode positioned on cell half 54A that provides an additional reference point for monitoring deflection of sensor diaphragm 38. Electrode 52A and electrode 122A are connected to circuit board 36 (FIG. 2) through lead wires 58A and 59A, respectively, which extend through opening 76A. Likewise, sensor electrode 38 is connected to circuit board 36 through lead wire 126. Lead wires 58A, 59A and 126 are used to bring capacitance signals out of sensor 120 and into transmitter circuitry 22 (FIG. 1). Transmitter circuitry 22 includes software and algorithms for conducting error compensation computations based on the responses of electrode 52A and electrode 122A to changes in position of sensor diaphragm 38. In one embodiment of the invention, electrode 122A comprises a SATURN™ electrode, further explanation of which and its various embodiments can be found in the aforementioned U.S. Pat. No. 6,295,875 to Frick et al. Sensor 120 of the present invention, however, includes an integrated fill fluid heating system for performing thermal-based diagnostics on sensor 120. In the embodiment shown, sensor 120 includes diagnostic wire 124A, which extends from electrode 52A through opening 76A in cell half 54A to connect to circuit board 36 and does not influence operation of electrodes 52A and 122A.

Figure 12:
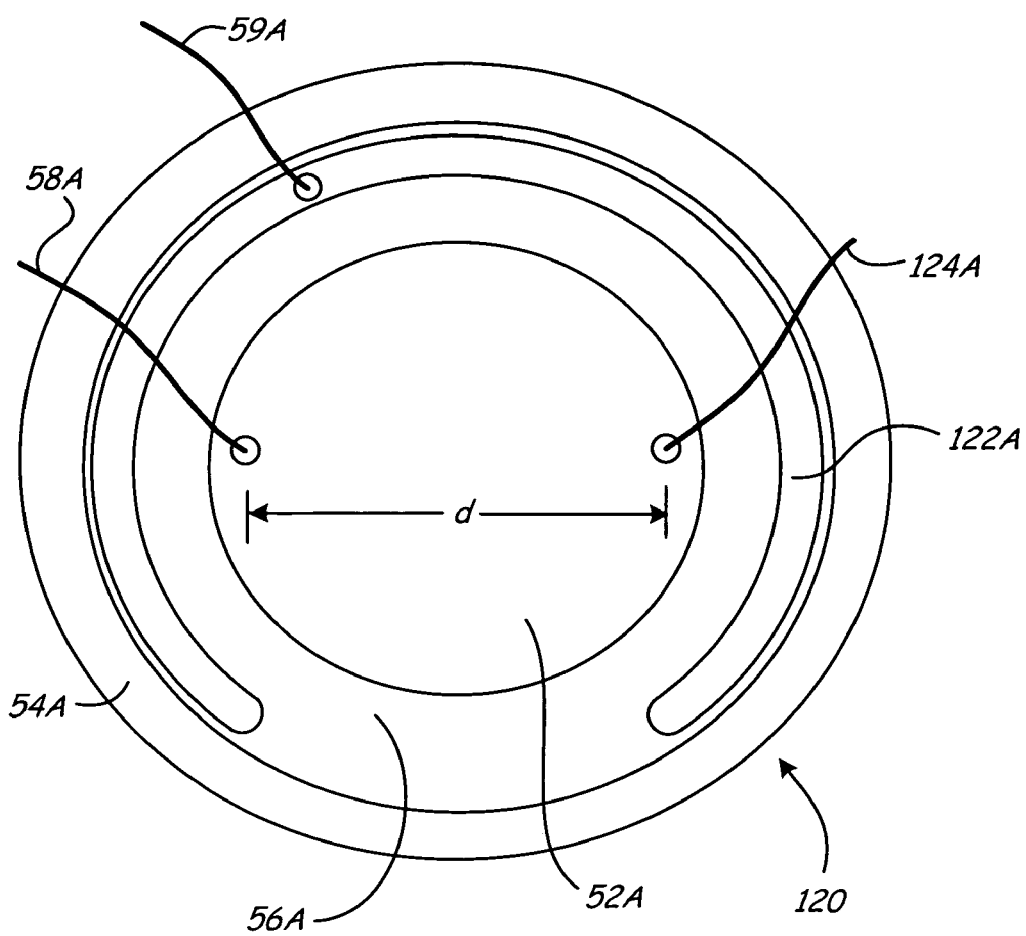
FIG. 12 shows a diagrammatic view of the pressure sensor cell of FIG. 11 illustrating the placement of lead wires for the integrated error compensation electrode and fill fluid heating system.

FIG. 12 shows a diagrammatic view of pressure sensor 120 of FIG. 11 illustrating the placement of lead wire 59A on electrode 122A, and lead wire 58A and diagnostic wire 124A on electrode 52A. Diagnostic wire 124A is selectively operated to provide a power pulse to electrode 52A. Specifically, a voltage is applied across wires 58A and 124A to cause resistive heating of electrode 52A such that thermal-based diagnostics of sensor 120 can be performed. The direct heating of electrode 52A within sensor 120 produces both a real and false pressure signal that can each be used to diagnose functioning of sensor 120.

Insulator 56A initially comprises a block of insulating material, such as glass, that is shaped into a cup-like disk for use in sensor 120 with a grinding process. The block of insulating material is fabricated to include lead wires used in operating sensor 120 and the thermal-based diagnostic system. Specifically, wires 58A, 59A and 124A are embedded into the block such that they extend completely through the block. Wire 124A comprises any suitable wire that can deliver a charge to electrode 52A and can thus be fabricated from stock material used to produce wires 58A and 59A. A first end of the wires are ultimately connected to circuit board 36, as shown in FIG. 2, while a second end of the wires are ultimately connected to electrode plate 52A and electrode 122A. The second end of the lead wires are truncated to be flush with the surface of insulator 56A when the block is ground down to form interior cavity 74 (FIG. 11). Electrode 52A comprises a conductive metal coating, such as vapor-deposited chrome, that is deposited onto the surface of insulator 56A that forms interior cavity 74. Lead wire 58A and diagnostic lead 124A are thereby electrically connected to electrode 52A. Thus, a low cost and integrated heating element is provided by using existing electrode manufacturing methods.

Manufacturability of sensor 120 requires precise placement of diagnostic lead 124A on electrode 52A with respect to lead wire 58A such that distance d between wires 58A and 124A remains nearly constant in every sensor cell. The distance d between where wires 58A and 124A are joined to electrode plate 52A determines the magnitude of the resistance, and hence heat, produced when the power pulse is applied across wires 58A and 124A. With distance d remaining nearly constant from one sensor to the next, standardized hardware and software can be used to carryout the diagnostic processes. In other embodiments, diagnostic wire 124A may be connected to electrode 122A such that a diagnostic power pulse may be applied across electrode 122A in conjunction with lead wire 59A. In still other embodiments, lead wires 124A and 124B may be connected to a resistive heating element distinct from electrode plate 52A. For example, a resistor may be embedded into insulator 56A or deposited onto insulator 56A. In any embodiment, application of a power pulse across a resistive heating element positioned within sensor 120 produces resistive heating that causes heating of the fill fluid within sensor 120. The heating of the fill fluid causes a volumetric, thermal expansion of the fill fluid that produces a real pressure signal, enabling thermal-based diagnostics to be performed on sensor 120, as was discussed with reference to FIGS. 1-10. The localized heating of the fill fluid between the electrode plates of sensor 120 provides additional benefits in producing the diagnostic pressure signal and performing the thermal-based diagnostics of the present invention.

Placement of a heating element directly within sensor 120 permits heating of a greater percentage of the fill fluid. For example, electrode plate 52A is in direct contact with the fill fluid within sensor 120 and is therefore in thermal communication with a greater portion of the overall fill fluid within transmitters using sensor 120, as compared to transmitters using heating elements 32A or 32C and sensor 24 which are connected to a small percentage of the fill fluid outside of sensor 24. In addition to heating a greater percentage of fill fluid, electrode plate 52A more efficiently heats the fill fluid. Specifically, little heat is needed to raise the temperature of the vapor deposition layer comprising electrode plate 52A, as compared to the heat required to heat isolation tube 46A or fill tube 50A and the fill fluid therein. Furthermore, electrode 52A is deposited onto insulator 56A, which is comprised of glass or some other highly insulating material, such that heat is not dissipated into cell half 54A, but is rather directed to the fill fluid.

Inefficiencies in transmitting heat from the heating element to the fill fluid in sensor 24 are eliminated in sensor 120. Elimination of these inefficiencies increase repeatability and reduces power consumption in performing the diagnostics. Heating of fill tube 50A, isolation tube 46A, isolation layer 100 (FIG. 4A) and the fill fluid therein in sensor 24 introduces additional variable in heating of the fill fluid. Thus, there are additional factors that need to be accounted for in correlating the voltage input to the induced pressure signal output. By more directly heating the fill fluid as with the heating element of sensor 120, some of these additional factors are eliminated. Likewise, the increased efficiencies in heating provided by diagnostic wires 124A and 124B results in less power being required to perform the diagnostics, as there are fewer components that need to be heated to produce a rise in the temperature of the fill fluid. As such, power scavenging from the control loop, such as is done with circuit 106 in FIG. 5, is more readily accomplished. Conversely, with the same amount of power consumption, the efficiency of diagnostic wires 124A and 124B permits sensor 120 to reach higher temperatures. As such, the fill fluid undergoes a greater amount of thermal expansion such that stiffer sensor diaphragms can be deflected. As such, the stiffness of sensor diaphragms 38 can be increased, such as for use in higher range pressure transmitters.

Placement of a heating element within sensor 120 also achieves rapid heating of the fill fluid. Diagnostic wire 124A permits electrode plate 52A to rapidly heat the fill fluid within interior cavity 74 (FIG. 11) between electrode plate 52A and sensor diaphragm 38. This is advantageous for achieving rapid diagnostic results as well as for avoiding problems associated with overheating. As explained above, overheating may cause unwanted heating of circuit board 36. Additionally, slow heating of the fill fluid within sensor 24 (FIG. 2) permits heat to migrate from one cell half to the other cell half, which eventually leads to thermal equilibrium within sensor 24 and the cancellation of any thermal-based diagnostic signal. Thus, direct heating of electrode 52A in sensor 120 produces a rapid and sharp pressure differential between the fill fluid on either side of sensor diaphragm 38 such that more accurate thermal-based diagnostics may be performed;

The placement of a heating element within sensor 120 also alleviates two intrinsic safety concerns. Specifically, the requirement to provide isolation and insulation to fill tube 50A, such as shown in FIG. 4A, is eliminated. First, isolation layer 100 is provided to separate the heating coil 98 from fill tube 50A, which is grounded to the exterior of the transmitter, to avoid a potential flame initiation such as a spark. Second, insulation layer 102 is provided to prevent exposed surfaces of fill tube 50A from exceeding a threshold temperature to avoid heat related flame initiations. With lead wire 124 already internalized within cell half 54A, there is no need to further isolate and insulate the heat source.

The localized heating of the fill fluid between the electrode plates of sensor 120 also enables a false pressure signal to be produced that expands the range of sensors in which the thermal-based diagnostics of the present invention can be used. As explained above with reference to Equation [1], the capacitance between first electrode 52A and sensor diaphragm 38 is dependent on two variables: the distance X between the electrodes, and the dielectric constant $\in$ of the fill fluid. A change in a pressure signal derived from a capacitance signal thus has two components: a first based on the change in position X, and a second based on a change in the dielectric constant $\in$ of the fill fluid. The first component reflects a true change in the pressure that results directly from a physical change in the position of sensor diaphragm 38. This can be brought about by increasing pressure on sensor diaphragm 38 through thermal expansion of the fill fluid. The second component reflects a true change in the dielectric constant $\in$, which does not require movement of sensor diaphragm 38 or a change in pressure, and can thus be thought of as a false pressure change.

The localized heating of the fill fluid between sensor diaphragm 38 and first electrode 52A caused by placement of a heating element within sensor 120 produces both a change in the distance X and the dielectric constant $\in$. For example, if the fill fluid in cell half 54A of sensor 120 were heated using diagnostic wire 124A, sensor diaphragm 38 would move away from electrode 52A from thermal expansion of the fill fluid, causing a reduction in the capacitance between electrode 52A and diaphragm 38. As such, the change in capacitance between first electrode 52A and sensor diaphragm 38 accurately reflects a true change in pressure felt by sensor 120. The internal heating of cell half 54A would additionally reduce the capacitance due to the increase in temperature of the fill fluid and a corresponding decrease in the dielectric constant $\in$. As such, the change in capacitance between first electrode 52A and sensor diaphragm 38 reflects a false change in pressure felt by sensor 120. Conventional pressure sensors are unable to distinguish between true and false changes in pressure based solely on a change in the capacitance of the pressure sensor. One embodiment of the present invention utilizes controlled false pressure signals to verify operation of capacitance-based pressure sensors.

False pressure signals do not require movement of sensor diaphragm 38 and can thus be useful in pressure sensors having stiff diaphragms. The heating provided by heating elements 90 and 96 (FIGS. 3 and 4) influence the fill fluid within sensor 24 by causing expansion of the fill fluid outside of sensor 24, within isolation tube 46A or fill tube 50A. Changing the position of sensor diaphragm 38 by expanding the volume of the fill fluid outside of the sensor is effective in low range pressure sensors where the stiffness of sensor diaphragm 38 is relatively low. However, in higher range pressure sensors, the stiffness of sensor diaphragm 38 can become such that the slight change in volume of the fill fluid produced by heating elements 90 or 96 cannot produce a change in pressure large enough to influence the position of sensor diaphragm 38. Furthermore, heat put into isolation tube 46A or fill tube 50A from heating elements 90 or 96 does not migrate to the fill fluid between electrode plate 52A and sensor diaphragm 38, and thus does not produce a false pressure signal. In the case of diagnostic wire 124A, however, where the heating element is positioned to directly heat the fill fluid between electrode 52A and diaphragm 38, a false pressure signal is produced that can be detected regardless of the stiffness of sensor diaphragm 38.

The known heat or electric input into diagnostic wire 124A can be correlated to a change in dielectric constant, which can then be used to determine a known false pressure signal to diagnose the operation of pressure sensor 120. The relationship between the dielectric constant $\in$ and temperature is generally known or can be determined for the present purposes. For example, it is known that the dielectric constant of silicone oil decreases linearly with increased temperature due primarily to the expansion of the fluid, i.e. a decrease in density, resulting in less polarization of the fluid per unit volume. The heat input into electrode 52A can be monitored using temperature sensors placed on cell half 54A. The magnitude of the true pressure signal is a function of the position of sensor diaphragm 38, while the magnitude of the false pressure signal is a function of the dielectric $\in$. The true pressure signal and the false pressure signal can be separated from each other using a microcontroller or an application-specific integrated circuit. In another embodiment, the false pressure signal can be separated from the true pressure signal by heating one side of the pressure sensor and measuring the pressure change on the opposite side. Operation of the heating element comprising diagnostic wire 124A can be powered and controlled in a manner similar to what is described with respect to sensor 24.

Although the use of heating elements and diagnostic processes have been described with respect to capacitarice-based pressure sensors and planar-mounted differential pressure sensors, thermal-based diagnostic of the present invention may also be used in other process control sensors and instruments. For example, other oil-based pressure sensors and in-line process transmitters may also include thermal-based diagnostics of the present invention, as is described with reference to FIGS. 13-14. Additionally, remote seal systems may also include thermal-based diagnostics of the present invention, as is described with reference to FIGS. 15-16.

Figure 13:
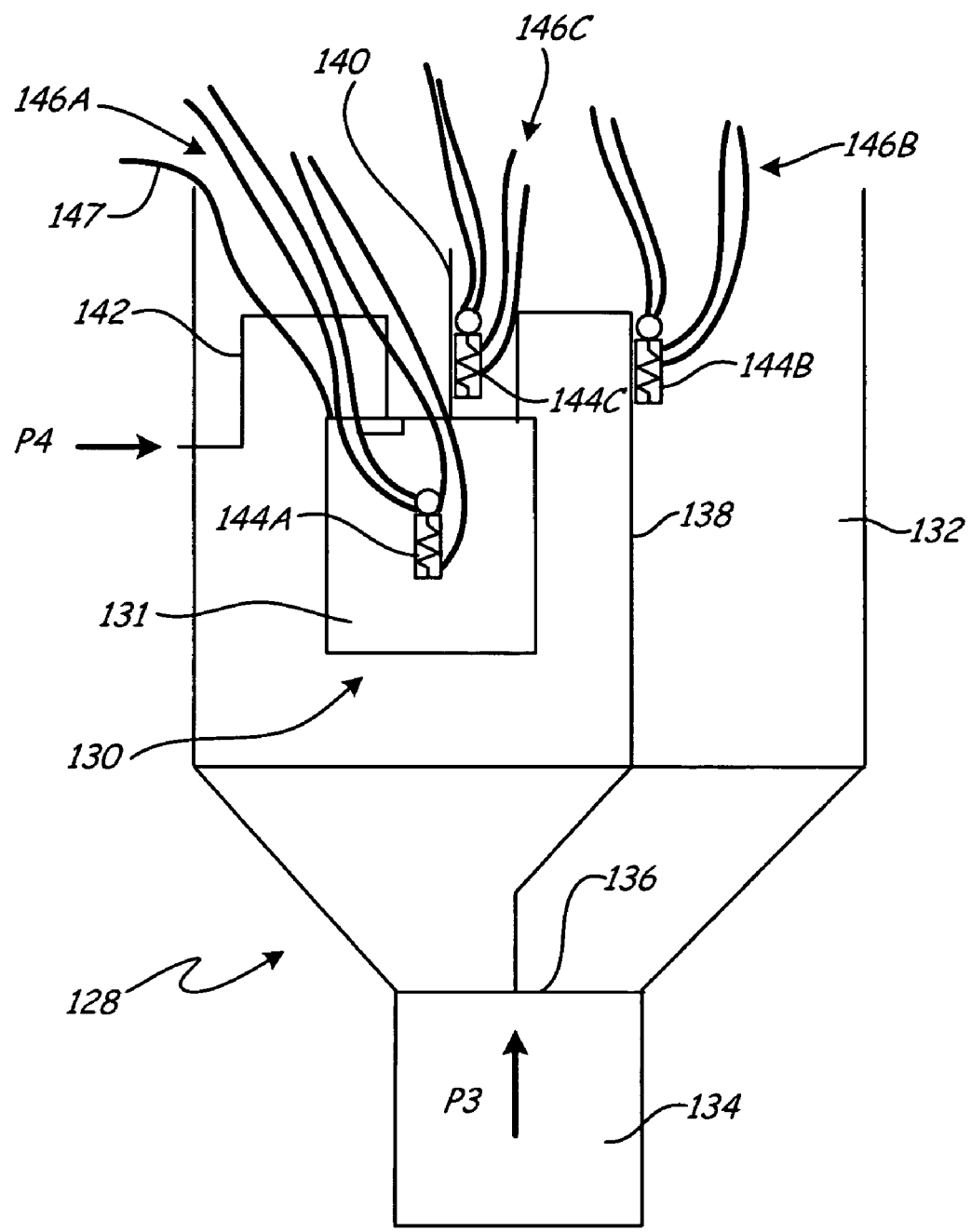
FIG. 13 shows an in-line-mounted pressure transmitter including a thermal-based sensor diagnostic system of the present invention.

FIG. 13 shows a schematic of sensor module 128 of an in-line pressure transmitter having strain gage pressure sensor 130 and thermal-based diagnostics of the present invention. Sensor module 128 includes sensor header 131, housing 132, process connection 134, isolation diaphragm 136, isolation tube 138, fill tube 140 and atmospheric tube 142. Sensor module 128 also includes heating elements 144A, 144B and 144C and corresponding lead wires 146A, 146B and 146C for carrying out thermal-based diagnostics similar to what is described with respect to FIGS. 1-10. Housing 132 provides a means for connecting strain gage pressure sensor 130 with a process fluid and with transmitter electronics. For example, process connection 134 comprises a connector having internal threads for connecting to a process pipe such as connection 39A of FIG. 1. Likewise, housing 132 includes external threads for connecting with an electronics housing, such as housing 30 of FIG. 1. Within the electronics housing, sensor 130 is connected to a circuit board, such as circuit board 36 (FIG. 1), with lead wire 147. As such, sensor module 128 communicates with a control loop and electronics such that pressure sensing processes can be electronically executed and monitored in a control room or at a local display.

Process connection 134 is configured to place isolation diaphragm 136 in direct contact with a process fluid such that absolute or gage pressure of the process fluid may be obtained with sensor 130. Isolation tube 138 comprises hollow tubing that transmits pressure P3 from isolation diaphragm 136 to sensor 130 through a fill fluid such that absolute pressure of the process fluid may be measured. Sensor module 128, however, includes atmospheric tube 142 for exposing sensor 130 to atmospheric pressure P4 such that a gage pressure of the process fluid is actually measured. Each end of isolation tube 138 is sealed with sensor header 131 and diaphragm 136, respectively, such that a fill fluid is trapped between isolation diaphragm 136 and a flexible element within sensor 130. Fill tube 140 comprises hollow tubing that extends from sensor header 131 such that fill fluid can be introduced into isolation tube 138. Fill tube is filled and crimped, such as is done with fill tube 50A of sensor 24 (FIG. 2) to fluidly link isolation diaphragm 136 with sensor 130. Isolation diaphragm 136 comprises a flexible member that is configured to transmit pressure from a process fluid to sensor 130 through isolation tube 138 through the fill fluid. Pressure from the process fluid deflects isolation diaphragm 136, which in turn displaces the fill fluid within isolation tube 138. The fill fluid then displaces a flexible element within sensor 130. Displacement of the flexible element within sensor 130 can also be displaced by heating of the fill fluid with one or more of heating elements 144A, 144B and 144C.

Heating elements 144A-144C comprise resistive heating devices, such as resistors or coils described with respect to FIGS. 3 and 4, and are selectively positioned around sensor 130 to heat the fill fluid. Heating element 144C is positioned on fill tube 140 and is configured to heat fill fluid entering sensor 130 through fill tube 140, similarly as to how heating elements 32A and 32B heat fill tubes 50A and 50B of sensor 24 (FIG. 2). Heating element 144B is positioned on isolation tube 138 and is configured to heat fill fluid entering sensor 130 through isolation tube 138, similarly as to how heating elements 32C and 32D heat isolation tubes 46A and 46B of sensor 24 (FIG. 2). Heating element 144A is positioned on sensor header 131 and is configured to heat fill fluid within sensor 130 through the sensor header 131. In another embodiment, heating element 144A is configured to heat and distort sensor header 131, similarly as to how heating elements 32E and 32F distort sensor cells 54A and 54B of sensor 24 (FIG. 2). In yet another embodiment, heating element 144A is configured to direct heat fill fluid within sensor 130, similarly as to how diagnostic wires 124A and 124B heat fill fluid within sensor 120 (FIGS. 11 & 12). Lead wires 146A-146C are configured to connect to a circuit board, such as circuit board 36 (FIG. 2), such that the thermal-based diagnostics of the present invention can be carried out.

Figure 14:
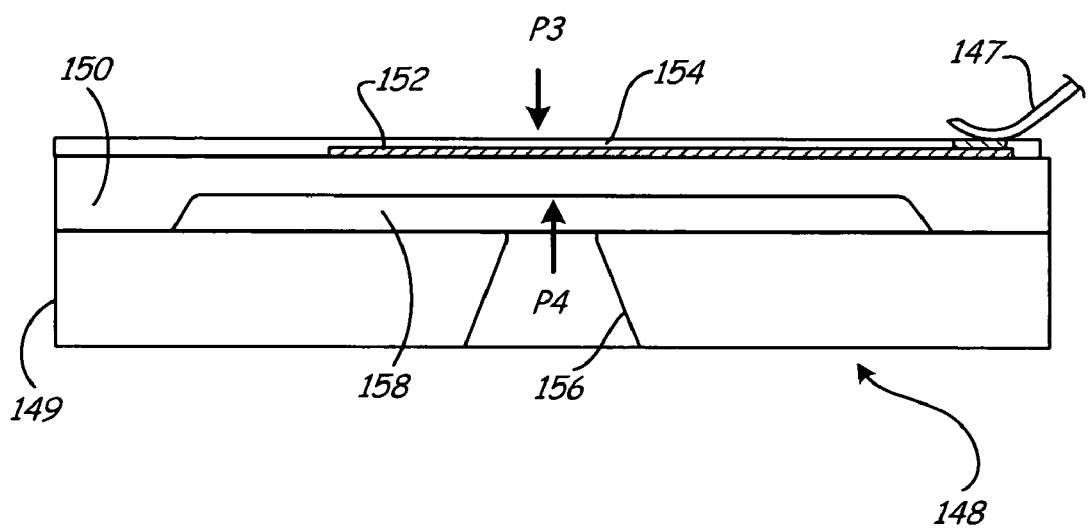
FIG. 14 shows a schematic of a strain-based absolute or gage pressure sensor used in the pressure sensor of the in-line pressure transmitter of FIG. 13.

FIG. 14 shows a schematic of flexible strain gage 148 within header 131 of FIG. 13 illustrating the effects of heating elements on the operation of sensor 130. Strain gage 148 includes lead wire 147, support layer 149, flexible member 150, strain gage element 152, coating 154, bore 156 and pressure pocket 158. Support layer 149 comprises a stiff base member upon which flexible member 150 is built. Flexible member 150 comprises a substrate that flexes under pressure P3 from the fill fluid. Flexible member 150 includes pressure pocket 158 along a surface facing support layer 149 such that flexible member 150 is permitted to flex in two directions. Bore 156 is provided in support layer 149 to permit atmospheric pressure P4 to reach flexible member 150 inside pressure pocket 158. Flexible member 150 thus flexes as pressure P3 changes with respect to atmospheric pressure P4.

Strain gage element 152 is deposited along a surface of flexible member 150 open to fill fluid within isolation tube 138 (FIG. 13). Strain gage element 152 comprises any conventional strain gage sensing element as is known in the industry. For example, strain gage element 152 may comprise, in various embodiments, a Wheatstone bridge, a piezoelectric element, a thin film circuit or a semiconductor-type strain gage. Strain gage element 152 is affixed to a surface of flexible member 150 such that as flexible member 150 flexes under pressure from the fill fluid, strain gage element 152 is stretched or compressed. For example, as pressure P3 increases, flexible member 150 becomes more convex with respect to pressure pocket 158, and strain gage element 152 becomes concave. As such, strain gage element 150 is compressed and the surface of strain gage element becomes smaller. With the surface area of strain gage element reduced, the resistance of strain gage element is also reduced. Strain gage element 152 is connected to lead wire 147, which is connected to circuit board 36 and transmitter electronics 22 (FIG. 1) such that resistance of strain gage element 152 can be correlated to the pressure on flexible member 150, as is conventionally known.

Heating devices 144A-144C of the present invention are used to thermally expand the fill fluid to increase the pressure P3 exerted on flexible member 150. For example, heating device 144A (FIG. 13) may be positioned on header 131 adjacent flexible member 150 to heat a portion of the fill fluid near strain gage element 152. In other embodiments, however, a heating element may be directly incorporated into flexible member 150 such that the fill fluid is more directly heated. In any embodiment, a heating element is used to thermally expand the volume of the fill fluid to influence the strain induced in strain gage element 152. The change in strain is detected by transmitter electronics 22 (FIG. 1) as a change in resistance across sensor 130. The change in resistance is ultimately correlated to the amount of induced heat from the heating element(s) such that the thermal-based diagnostics of the present invention can be performed, as described with respect to FIGS. 1-10.

Figure 15:
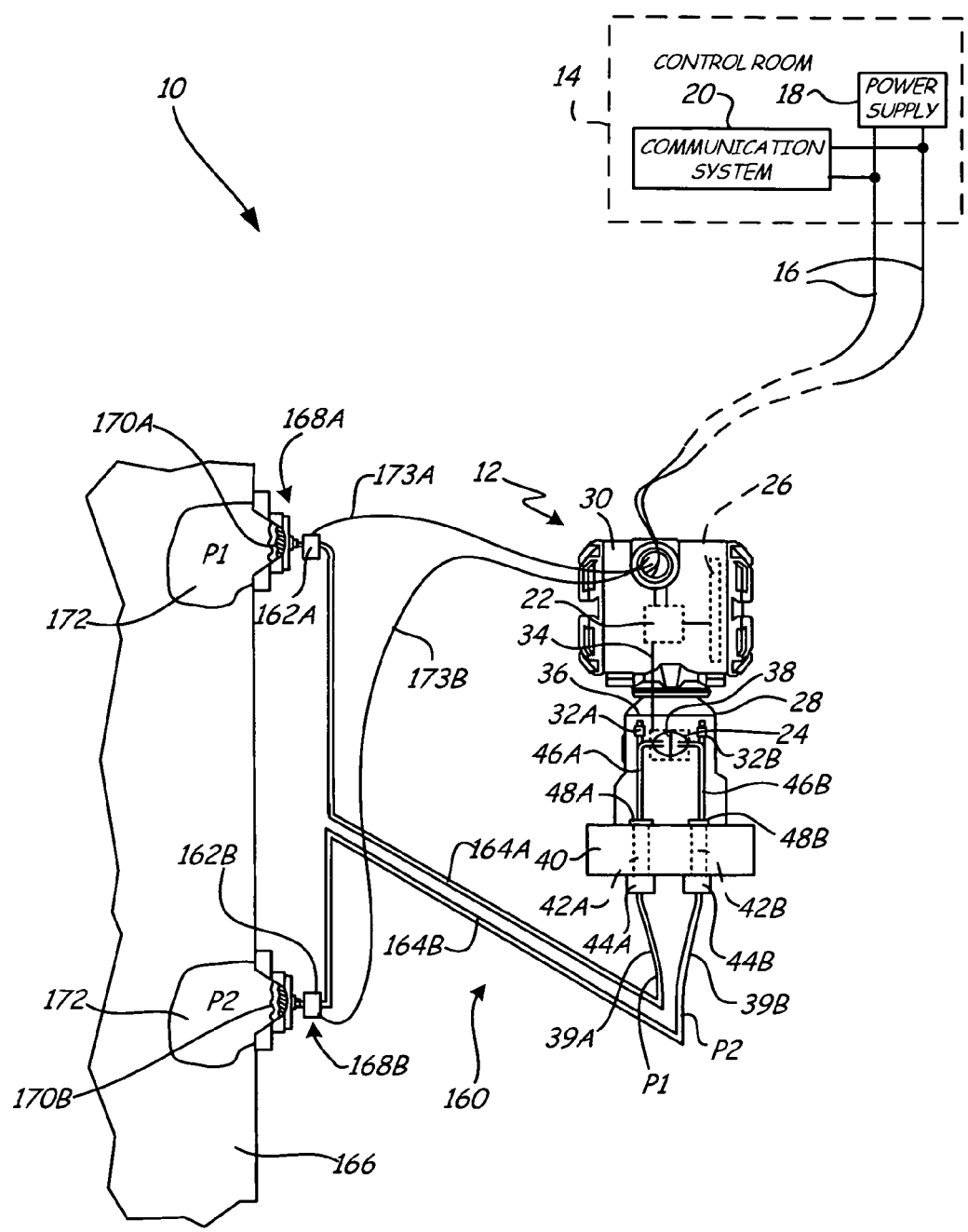
FIG. 15 shows a remote seal system having heating devices for use with a thermal-based diagnostic system of the present invention.

FIG. 15 shows remote seal system 160 having heating devices 162A and 162B for use with a thermal-based diagnostic system of the present invention. Remote seal system 160 is connected to flange 40 of transmitter 12 through capillaries 164A and 164B, which are connected to process fluid vessel 166 using remote seal assemblies 168A and 168B. Remote seal assemblies 168A and 168B include isolation diaphragms 170A and 170B which contact process fluid 172 within vessel 166. Capillaries 164A and 164B are connected with flange 40 through couplers 44A and 44B. Channels 42A and 42B extend through process flange 40. Capillaries 164A and 164B comprise steel tubing, which is typically surrounded by a flexible sheathing, to provide both a strong and sealed connection between flange 40 and remote seal assemblies 168A and 168B. Capillaries 164A and 164B and channels 42A and 42B are filled with a remote seal system hydraulic fluid, similar to that of the sensor fill fluid within isolation tubes 46A and 46B. Pressures P1 and P2 of process fluid 172 are thus relayed from isolation diaphragms 170A and 170B, respectively, to isolation diaphragms 48A and 48B at transmitter 12 through the hydraulic fluid, whereby the fill fluid within isolation tubes 46A and 46B control the position of sensor diaphragm 38 in sensor 24. Heating devices 162A and 162B are used to effect a controlled movement of sensor diaphragm 38 by expanding the hydraulic fluid within capillaries 164A and 164B to cause a physical shift in the fill fluid within sensor 24, which can be used to verify operation of both sensor 24 and remote seal system 160. In the embodiment shown, heating devices 162A and 162B are included on capillaries 164A and 164B near remote seal assemblies 168A and 168B, respectively. In other embodiments, however, heating devices 162A and 162B are positioned closer to flange 40. In either embodiment, heating devices 162A and 162B are independently connected to transmitter 12 through lead wires 173A and 173B to provide the power necessary for generating the resistive heating necessary for executing the thermal-based diagnostics of the present invention. In yet other embodiments, heating elements are incorporated into capillary bundles to provide heating along the length of the capillary tubes, as is described with respect to FIG. 16.

Figure 16:
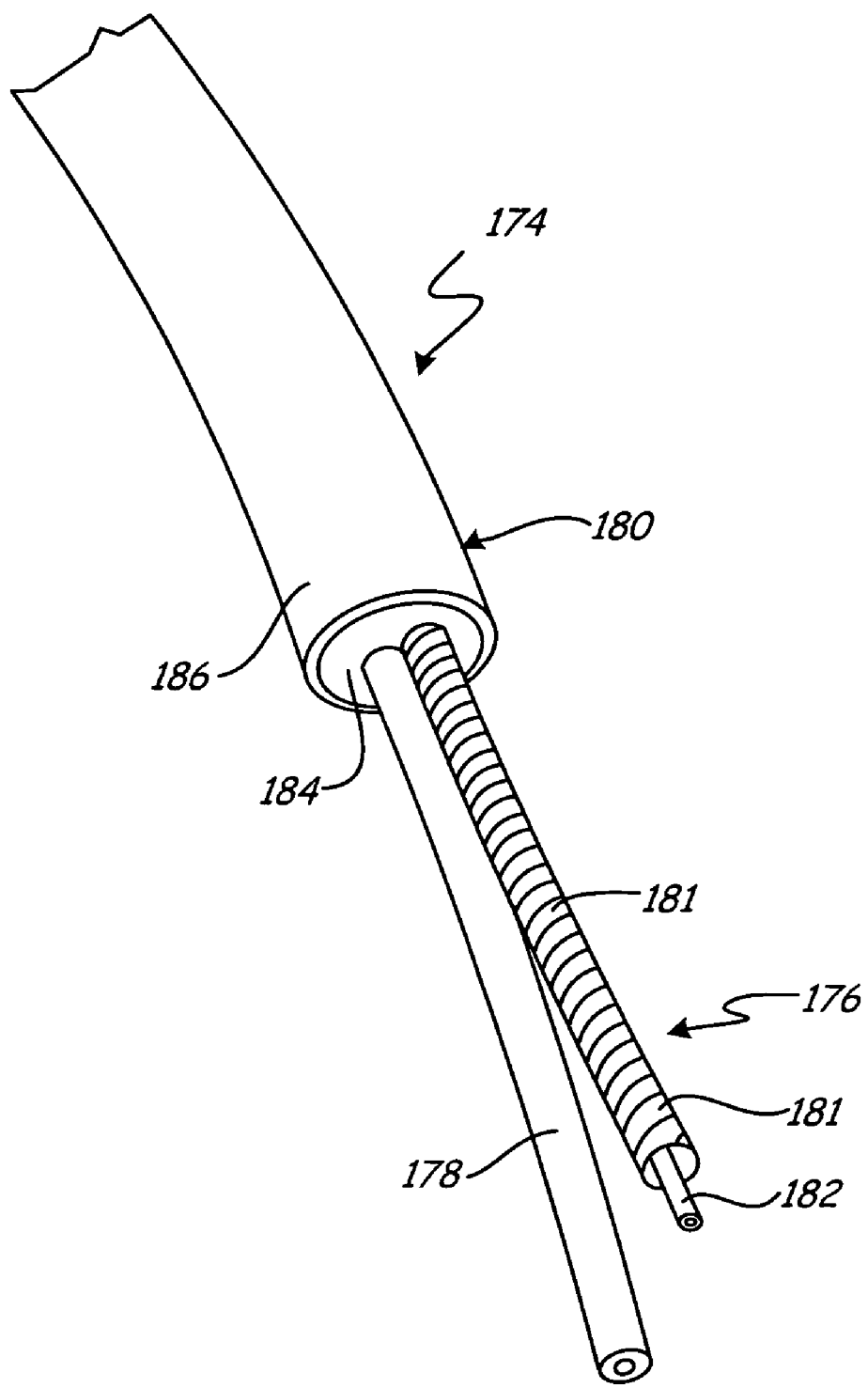
FIG. 16 shows a cut-away view of a capillary system having a capillary tube and a heater cable for the remote seal system of FIG. 15.

FIG. 16 shows a cut-away view of capillary system 174 having capillary 176, heater cable 178 and insulating sheath 180. Capillary system 174 comprises a bundled capillary heating system that is used to perform thermal-based diagnostics on remote seal system 160 of FIG. 15. Capillary 176, which is similar to capillary 164A of FIG. 15, comprises flexible steel capillary sheath 181 that encloses flexible steel capillary tubing 182. Capillary tubing 182 provides a sealed link between remote seal assembly 168A or 168B and process flange 40 using coupler 44A or 44B, respectively. Capillary sheath 181 protects inner capillary tubing 182 while maintaining a degree of flexibility. Heater cable 178 comprises a resistive heating wire that is enclosed within an electrically insulating sheathing. Heater cable 178 extends the length of remote seal system 160 inside of insulating sheath 180 and alongside capillary sheath 181. Heater cable 178 is independently connected to transmitter circuitry 22 through a lead wire to provide the power necessary to heat heater cable 178. Heater cable 178 provides near uniform heating of capillary sheath 176 such that the entire volume of the fill fluid contained within capillary tubing 182 expands to deflect isolating diaphragms at both the remote seal assembly and the process transmitter. For example, capillary system 174 can be connected to remote seal assembly 168A and flange 40 to deflect both isolation diaphragm 170A and isolation diaphragm 48A as heater cable 178 increases the pressure within capillary tube 182 through thermal expansion. Thermal-based diagnostics can be carried out in accord with the present invention to verify operation of isolation diaphragms 48A and 170A based on a corresponding response to a change in position of sensor diaphragm 38. Insulating sheathing 180 comprises insulating layer 184 and protective jacket 186. Insulating layer 184 comprises a thermally insulating material that prevents heat from escaping capillary system 174 such that heat is concentrated around capillary 176. Protective jacket 186 comprises a sleeve, such as a polymer coating, that maintains assembly of capillary 176, heater cable 178 and insulating layer 184 and prevents damage to capillary system 174. In one embodiment of the invention, capillary system 174 comprises a commercially available capillary heating system that is typically used for preventing freezing or other unwanted temperature changes in remote seal systems. For example, in one embodiment of the invention, capillary system 174 comprises a commercially available bundle, such as a TRACEPAK® system available from the O'Brien Corporation, St. Louis, Mo., that is used to produce the pressure pulse for performing the thermal-based diagnostics of the present invention.

Although the present invention has been described with reference to preferred embodiments, workers skilled in the art will recognize that changes may be made in form and detail without departing from the spirit and scope of the invention.

The invention claimed is:

1. A process transmitter for measuring a process variable, the process transmitter comprising:
    a sensor module comprising:
        a sensor for measuring a process variable of an industrial process and generating a sensor signal;
        a housing containing the sensor;
        a flexible sensor element disposed within the sensor, a position of which corresponds to a magnitude of the sensor signal;
        an isolation diaphragm positioned on an exterior of the housing;
        an isolation tube connecting the flexible sensor element with the isolation diaphragm; and
        a fill fluid positioned within the isolation tube to influence a position of the flexible sensor element based on a magnitude of the process variable;
    a heating device connected to the sensor module for generating a heat pulse to influence generation of the sensor signal; and
    transmitter circuitry connected to the sensor and the heating device;
    wherein the transmitter circuitry verifies operation of the sensor by measuring a change in the sensor signal due to the heat pulse.

2. The process transmitter of claim 1 wherein the heat pulse from the heating device raises the temperature of the fill fluid.

3. The process transmitter of claim 2 wherein:
    the sensor comprises a cell body having a first capacitor plate; and
    the flexible sensor element comprises a flexible diaphragm connected to the cell body adjacent the capacitor plate to function as a variable capacitor plate.

4. The process transmitter of claim 3 wherein the heat pulse from the heating device changes a capacitance between the capacitor plate and the flexible diaphragm.

5. The process transmitter of claim 4 wherein the heating device comprises a resistive heating element disposed externally to the cell body of the sensor.

6. The process transmitter of claim 5 wherein the heat pulse from the resistive heating device changes a volume of the fill fluid to induce a change in position of the flexible diaphragm to change the capacitance between the capacitor plate and the flexible diaphragm.

7. The process transmitter of claim 6 wherein the heating device comprises:
    an isolation sleeve positioned around a segment of the isolation tube;
    a wire coil winding wrapped around the isolation sleeve; and
    an insulation sleeve wrapped around the wire coil winding.

8. The process transmitter of claim 6 wherein the heating device comprises a plurality of resistors displaced around a circumference of the isolation tube.

9. The process transmitter of claim 6 wherein the heating device comprises a heating element disposed within the isolation tube to contact the fill fluid.

10. The process transmitter of claim 4 wherein the heating device comprises a resistive heating element disposed internally to the cell body of the sensor.

11. The process transmitter of claim 10 wherein the heat pulse from the resistive heating device changes a dielectric value of the fill fluid to change the capacitance between the capacitor plate and the flexible diaphragm.

12. The process transmitter of claim 11 wherein the heating device comprises:

a first lead wire connected to the first capacitor plate and the transmitter electronics; and a second lead wire connected to the first capacitor plate and the transmitter electronics;

wherein the transmitter electronics is configured to apply a voltage across the first and second lead wires to cause resistive heating of the capacitor plate.

13. The process transmitter of claim 2 wherein the flexible sensor element comprises a strain gage.

14. The process transmitter of claim 13 wherein the heat pulse from the heating device changes strain within the strain gage.

15. The process transmitter of claim 14 wherein the heat pulse changes a volume of the fill fluid to induce a change in position of the strain gage.

16. The process transmitter of claim 1 wherein the heat pulse from the heating device causes a change in position of the flexible sensor element.

17. The process transmitter of claim 16 wherein the heat pulse from the resistive heating device changes a volume of the fill fluid to induce the change in position of the flexible diaphragm.

18. The process transmitter of claim 17 wherein:

the sensor comprises a cell body having a first capacitor plate; and the flexible sensor element comprises a flexible diaphragm connected to the cell body adjacent the capacitor plate to function as a variable capacitor plate.

19. The process transmitter of claim 18 wherein the change in position of the flexible sensor element causes a change in capacitance between the first capacitor plate and the flexible diaphragm.

20. The process transmitter of claim 16 wherein the heat pulse from the resistive heating device causes a thermal expansion of the cell body to produce a deflection of the flexible sensor element.

21. The process transmitter of claim 20 wherein the flexible sensor element comprises a strain gage.

22. The process transmitter of claim 1 wherein the heating device comprises a resistive heating element selected from the group consisting of a resistor and a coil winding.

23. The process transmitter of claim 1 and further comprising a battery for supplying power to the heating device.

24. The process transmitter of claim 1 wherein the flexible sensor element is selected from the group consisting of: a flexible capacitor plate and a strain gage.

25. The process transmitter of claim 1 wherein the transmitter circuitry generates an expected pressure signal based on the heat pulse and correlates the expected pressure signal to the generated sensor signal to verify calibration of the pressure sensor.

26. The process transmitter of claim 25 and further comprising:

a power generating circuit for supplying power to the heating device, the circuit comprising:

a capacitor for storing power to be supplied to the heating device; and a plurality of switches for regulating current flow to the capacitor and the heating device.

27. The process transmitter of claim 26 wherein the capacitor comprises a supercapacitor.

28. The process transmitter of claim 26 wherein the transmitter circuitry is configured to:

provide a continuous flow of current from the transmitter circuitry to charge the capacitor; and direct charge stored on the capacitor to the heating device to generate the heat pulse.

29. The process transmitter of claim 26 wherein the transmitter circuitry is configured to:

provide a time-limited flow of current from the transmitter circuitry to charge the capacitor; and direct charge stored on the capacitor to the heating device to generate the heat pulse.

30. The process transmitter of claim 25 wherein the transmitter circuitry operates to verify operation of the sensor as a background operation while online with a process control loop.

31. The process transmitter of claim 25 wherein the transmitter circuitry operates to verify operation of the sensor while offline from a process control loop.

32. The process transmitter of claim 25 and further comprising a temperature sensor positioned adjacent the heating device to monitor heat output of the heating device.

33. The process transmitter of claim 25 wherein the process transmitter includes a plurality of heating devices.

34. The process transmitter of claim 33 wherein the transmitter circuitry alternately powers the plurality of heating devices to cancel errors generated by the heat pulse.

35. The process transmitter of claim 25 wherein the transmitter circuitry diagnoses a deficiency of fill fluid in the isolation tube, air in the fill fluid, a hydrogen permeated isolation diaphragm, or a ruptured isolation diaphragm after detecting a lack of a or a negligible generated sensor signal in response to the heat pulse.

36. The process transmitter of claim 25 wherein the transmitter circuitry diagnoses a plugged process connection after detecting a generated sensor signal in response to the heat pulse that is larger than the expected pressure signal.

37. The process transmitter of claim 25 wherein the transmitter circuitry diagnoses a corrupted flexible sensor element after detecting a generated sensor signal in response to the heat pulse that is smaller than the expected pressure signal.

38. The process transmitter of claim 1 and further comprising:

a remote seal system comprising:

a capillary tube having a first end extending from the isolation diaphragm;

a remote seal housing disposed at a second end of the capillary tube;

a remote fill fluid positioned within the capillary tube; and a remote isolation diaphragm positioned within the remote seal housing such that the remote fill fluid is sealed between the isolation diaphragm and the remote isolation diaphragm;

wherein the heating device is connected to the sensor module through the capillary tube and is positioned on the remote seal system to cause a thermal expansion of the remote fill fluid.

39. The process transmitter of claim 38 wherein the remote heating device comprises a resistive heating cable extending approximately an entire length of the capillary tube.

40. The process transmitter of claim 39 and further comprising:

a flexible capillary sheath surrounding the capillary tube;

an electrically insulating layer surrounding the heating cable;

a thermally insulating layer joining the capillary sheath with the electrically insulating layer; and a protective sheath surrounding the thermally insulating layer.

41. A method for diagnosing performance of a pressure sensor in an industrial process transmitter, the method comprising:

applying fluid pressure to a pressure sensor to produce a pressure signal representative of sensed pressure;

applying a heat pulse capable of causing a change in the sensed pressure; and producing a diagnostic test result based upon how the heat pulse affects the pressure signal.

42. The method of claim 41 wherein the diagnostic test result comprises a magnitude of change in the pressure signal.

43. The method of claim 41 wherein the diagnostic test result is produced by comparing a magnitude of change in the pressure signal with a magnitude of the heat pulse.

44. The method of claim 41 wherein the diagnostic test result is produced by comparing a magnitude of change in the pressure signal with a magnitude of energy used to produce the heat pulse.

45. The method of claim 41 wherein the diagnostic test result is produced by comparing an expected change in the pressure signal with an actual response of the pressure signal.

46. The method of claim 45 wherein:
the expected change in the pressure signal is based upon a magnitude of the heat pulse; and
the actual response of the pressure signal is based upon a reaction of the pressure signal to the heat pulse.

47. The method of claim 46 wherein the magnitude of the heat pulse is determined by a temperature sensor positioned adjacent an origination point of the heat pulse.

48. The method of claim 45 wherein:
the pressure sensor includes:
a cell body having a capacitor plate;
a flexible sensor element connected to the cell body adjacent the capacitor plate to function as a variable capacitor plate; and
a fill fluid disposed between the capacitor plate and the flexible sensor element; and
the step of applying the heat pulse further comprises causing a change in a dielectric of the fill fluid.

49. The method of claim 45 wherein:
the pressure sensor includes:
a cell body having a capacitor plate;
a flexible sensor element connected to the cell body adjacent the capacitor plate to function as a variable capacitor plate; and
a fill fluid disposed between the capacitor plate and the flexible sensor element; and
the step of applying the heat pulse further comprises causing a deflection of the sensing diaphragm by inducing a thermal expansion of the cell body.

50. The method of claim 45 wherein:
the pressure sensor includes:
a cell body having a capacitor plate;
a flexible sensor element connected to the cell body adjacent the capacitor plate to function as a variable capacitor plate; and
a fill fluid disposed between the capacitor plate and the flexible sensor element; and
the step of applying the heat pulse further comprises causing a deflection of the sensing diaphragm by inducing a thermal expansion of the fill fluid.

51. The method of claim 50 wherein the step of applying a heat pulse further comprises applying a plurality of alternating heat pulses that cause alternating, opposite deflections of the sensing diaphragm.

52. The method of claim 50 wherein the diagnostic test result indicates a presence of air or gas in the fill fluid, a ruptured isolation diaphragm, low fill fluid, or an open process connection when the heat pulse does not produce a change in the pressure signal or produces a negligible change in the pressure signal.

53. The method of claim 50 wherein the diagnostic test result indicates a plugged process connection when the actual response of the pressure signal is greater than the expected change in the pressure signal.

54. The method of claim 50 wherein the diagnostic test result indicates a corrupted sensor diaphragm when the actual response of the pressure signal is less than the expected change in the pressure signal.

55. The method of claim 41 wherein the step of applying the heat pulse comprises directing power from a battery to a heating device.

56. The method of claim 41 wherein the step of applying the heat pulse comprises directing current from a capacitor to a heating device.

57. The method of claim 56 wherein the capacitor comprises a supercapacitor.

58. The method of claim 56 wherein power is stored on the capacitor by charging the capacitor with a constant flow of current from circuitry within the transmitter.

59. The method of claim 56 wherein power is stored on the capacitor by charging the capacitor with a time dependent flow of current form circuitry within the transmitter.

60. The method of claim 41 and further comprising communicating the pressure signal and the diagnostic test result over a control loop connected to circuitry within the transmitter.

61. The method of claim 60 wherein the step of applying the heat pulse operates simultaneously with the step of communicating over the control loop.

62. The method of claim 60 wherein the step of applying the heat pulse operates alternatively with the step of communicating over the control loop.

63. An industrial process transmitter for sensing a pressure of a process fluid, the transmitter comprising:
a transmitter housing;
a pressure sensor disposed within the housing for sensing the process fluid pressure, the pressure sensor having a sensing diaphragm for generating a capacitive pressure signal;
an isolation diaphragm positioned on the transmitter housing to interact with the process fluid;
an isolation tube connecting the isolation diaphragm with the pressure diaphragm;
a fill fluid disposed within the isolation tube to transmit pressure from the isolation diaphragm to the sensing diaphragm to change the pressure signal as the process fluid pressure changes;
a heating device positioned to heat the fill fluid in the isolation tube to affect the capacitive pressure signal;
a temperature sensor disposed adjacent the heating device to monitor heat output of the heating device; and
transmitter electronics disposed within the housing and connected with the pressure sensor, the heating device and the temperature sensor, wherein the transmitter electronics perform diagnostics of the pressure sensor including verification of operation of the sensing diaphragm and calibration of the pressure sensor based on the capacitive pressure signal from the pressure sensor and heat output from the heating device.

* * * * *

UNITED STATES PATENT AND TRADEMARK OFFICE
CERTIFICATE OF CORRECTION

| | | |
|---|---|---|
| PATENT NO. | : 7,918,134 B2 | Page 1 of 1 |
| APPLICATION NO. | : 12/287106 | |
| DATED | : April 5, 2011 | |
| INVENTOR(S) | : Robert C. Hedtke et al. | |

It is certified that error appears in the above-identified patent and that said Letters Patent is hereby corrected as shown below:

Col. 22, Line 38
  Delete "capcitarice"
  Insert --capacitance--

Signed and Sealed this
Twenty-eighth Day of February, 2012

David J. Kappos
*Director of the United States Patent and Trademark Office*